US011068737B2

(12) United States Patent
Kumar et al.

(10) Patent No.: US 11,068,737 B2
(45) Date of Patent: Jul. 20, 2021

(54) PREDICTING LAND COVERS FROM SATELLITE IMAGES USING TEMPORAL AND SPATIAL CONTEXTS

(71) Applicant: Regents of the University of Minnesota, Minneapolis, MN (US)

(72) Inventors: Vipin Kumar, Minneapolis, MN (US); Xiaowei Jia, Minneapolis, MN (US); Ankush Khandelwal, Minneapolis, MN (US); Anuj Karpatne, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 57 days.

(21) Appl. No.: 16/371,269

(22) Filed: Apr. 1, 2019

(65) Prior Publication Data

US 2019/0303703 A1 Oct. 3, 2019

Related U.S. Application Data

(60) Provisional application No. 62/650,816, filed on Mar. 30, 2018.

(51) Int. Cl.
*G06K 9/46* (2006.01)
*G06N 3/04* (2006.01)
*G06N 3/08* (2006.01)
*G06K 9/00* (2006.01)

(52) U.S. Cl.
CPC .............. *G06K 9/46* (2013.01); *G06K 9/0063* (2013.01); *G06N 3/04* (2013.01); *G06N 3/08* (2013.01)

(58) Field of Classification Search
CPC ...... G06K 9/46; G06K 9/0063; G06K 9/4638; G06N 3/04; G06N 3/08; G06N 3/0481; G06N 5/02; G06N 3/0445; G06N 3/084
See application file for complete search history.

(56) References Cited

U.S. PATENT DOCUMENTS

2015/0278603 A1 10/2015 Boriah et al.

OTHER PUBLICATIONS

Jia et al. "Incremental Dual-memory LSTM in Land Cover Prediction", KDD'17, Aug. 13-17, 2017, Halifax, NS, Canada (Year: 2017).*
Adamo, Data mining for association rules and sequential patterns: sequential and parallel algorithms. Springer Science & Business Media, 10 pages, 2012.
Altun et al., "Hidden markov support vector machines," in ICML, 8 pages, 2003.

(Continued)

*Primary Examiner* — Qian Yang
(74) *Attorney, Agent, or Firm* — Theodore M. Magee; Westman, Champlin & Koehler, P.A.

(57) ABSTRACT

A method of identifying land cover includes receiving multi-spectral values for a plurality of locations at a plurality of times. A location is selected and for each time in the plurality of times, a latent representation of the multi-spectral values is determined based on a latent representation of multi-spectral values determined for a previous time and multi-spectral values for the previous time of a plurality of other locations that are near the selected location. The determined latent representation is then used to predict a land cover for the selected location at the time.

7 Claims, 13 Drawing Sheets

(56) References Cited

OTHER PUBLICATIONS

Batal et al., "Mining recent temporal patterns for event detection in multivariate time series data," in SIGKDD, ACM, 31 pages, 2012.
Bengio, et al. Learning long-term dependencies with gradient descent is difficult, IEEE transactions on neural networks, 35 pages, 1994.
Caragea et al., "Protein sequence classification using feature hashing," Proteome science, 8 pages, 2012.
Carlson et al., Carbon emissions from forest conversion by Kalimantan oil palm plantations, Nature Climate Change, pp. 283-287, 2013.
Chen et al., "A general framework to increase the robustness of model-based change point detection algorithms to outliers and noise," in SDM, pp. 162-170, 2016.
Cheng et al., "Discriminative frequent pattern analysis for effective classification," in ICDE, 10 pages, 2007.
Chung et al., "Empirical evaluation of gated recurrent neural networks on sequence modeling," arXiv preprint arXiv:1412.3555, 9 pages, 2014.
Dietterich et al., "Machine learning for sequential data: A review," in Joint IAPR International Workshops on SPR and SSPR. Springer, 15 pages, 2002.
Fan et al., Phenology-based vegetation index differencing for mapping of rubber plantations using Landsat oli data, Remote Sensing, vol. 7, pp. 6041-6058, 2015.
Fu et al., Transductive multi-view embedding for zero-shot recognition and annotation, in ECCV, 16 pages, 2014.
Goldberger et al., Neighbourhood components analysis, in NIPS, 8 pages, 2004.
Graves et al., A novel connectionist system for unconstrained handwriting recognition, PAMI, 14 pages, 2009.
Graves et al., "Speech recognition with deep recurrent neural networks," in ICASSP. IEEE, 5 pages, 2013.
Grimm et al., Global change and the ecology of cities. Science, vol. 319, pp. 756-760, 2008.
Gunarso et al., Roundtable on sustainable palm oil, Kuala lumpur, Malaysia, Reports from the technical panels of the 2nd greenhouse gas working group of RSPO, 196 pages, 2013.
Hansen et al., High-resolution global maps of 21st-century forest cover change, Science, vol. 342, pp. 850-853, 2013.
Homer et al., Development of a 2001 national land-cover database for the united states, Photogrammetric Engineering & Remote Sensing, vol. 70, No. 7, pp. 829-840, 2004.
Hu et al., "Action detection in complex scenes with spatial and temporal ambiguities," in Computer Vision, 2009 IEEE 12th International Conference on. IEEE, pp. 128-135, 2009.
Jia et al., Collaborative restricted Boltzmann machine for social event recommendation, in ASONAM, pp. 402-405, 2016.
Jia et al., Learning large-scale plantation mapping from imperfect annotators, in IEEE BigData, p. 1192-1201, 2016.
Jianya et al., "A review of multi-temporal remote sensing data change detection algorithms," ISPRS, pp. 757-762, 2008.
Jolliffe, Principal component analysis. Wiley Online Library, 2002.
Karpatne et al., Monitoring land-cover changes: A machine-learning perspective, IEEE Geoscience and Remote Sensing Magazine, pp. 8-21, 2016.
Koelstra et al., "DEAP: A database for emotion analysis; using physiological signals," TAC, 15 pages, 2012.
Lee et al., "Mining discriminative patterns for classifying trajectories on road networks," IEEE Transactions on Knowledge and Data Engineering vol. 23, No. 5, pp. 713-726, 2011.
Li et al., DRN: Bringing greedy layer-wise training into time dimension, IEEE International Conference on Data Mining, pp. 859-864, 2015.
Li et al., "Improving EEG feature learning via synchronized facial video," in IEEE Big Data. IEEE, pp. 843-848, 2015.
Liu et al., "Unified point-of-interest recommendation with temporal interval assessment," in SIGKDD. ACM, 10 pages, 2016.
Losing et al., KNN Classifier with Self Adjusting Memory for Heterogeneous Concept Drift, in ICDM, 10 pages, 2016.
Lyu et al., Learning a transferable change rule from a recurrent neural network for land cover change detection, Remote Sensing, vol. 8, No. 506, 22 pages, 2016.
Miettinen et al., 2010 land cover map of insular southeast Asia in 250-m spatial resolution, Remote Sensing Letters, vol. 3, No. 1, pp. 11-20, 2012.
Mikolov et al., Efficient estimation of word representations in vector space. arXiv preprint arXiv:1301.3781, 12 pages, 2013.
Min et al., Player goal recognition in open-world digital games with long short-term memory networks, 2016.
Ng et al., Beyond short snippets: Deep networks for video classification, in CVPR, 9 pages, 2015.
Norouzi et al., Stacks of convolutional restricted Boltzmann machines for shift-invariant feature learning, in CVPR, pp. 2735-2742, 2009.
Palatucci et al., Zero-shot learning with semantic output codes, in Advances in neural information processing systems, 9 pages, 2009.
Petersen et al., Mapping tree plantations with multispectral imagery: preliminary results for seven tropical countries, World Resources Institute, Technical Note, 18 pages, 2016.
Pielke, Land use and climate change, in Science, vol. 310, pp. 1625-1626, 2005.
Rabiner et al., "A tutorial on hidden markov models and selected applications in speech recognition," Proceedings of the IEEE, pp. 257-286, 1989.
Sauter et al., Spatio-temporal prediction of snow cover in the black forest mountain range using remote sensing and a recurrent neural network, International Journal of Climatology, vol. 30, pp. 2330-2341, 2010.
Shalaby et al., Remote sensing and gis for mapping and monitoring land cover and land-use changes in the northwestern coastal zone of Egypt, Applied Geography, vol. 27, pp. 28-41, 2007.
Simonyan et al., "Deep inside convolutional networks: Visualising image classification models and saliency maps," arXiv preprint arXiv:1312.6034, 8 pages, 2013.
Socher et al., Zero-shot learning through cross-modal transfer, in Advances in neural information processing systems, 10 pages, 2013.
Sundermeyer et al., LSTM Neural Networks for Language Modeling, in Interspeech, 4 pages, 2012.
Sutskever et al., "The recurrent temporal restricted Boltzmann machine," in NIPS, 8 pages, 2009.
Sutskever, Training recurrent neural networks. PhD thesis, University of Toronto, 101 pages, 2013.
USDA National Agricultural Statistics Service Cropland Data Layer, https://nassgeodata.gmu.edu/cropscape, accessed Apr. 5, 2019.
Verbesselt et al., Detecting trend and seasonal changes in satellite image time series, Remote Sensing of Environment, 28 pages, 2010.
Wang et al. "Harmony: Efficiently mining the best rules for classification," in SDM, 12 pages, 2005.
Wu et al., Monitoring and predicting land use change in Beijing using remote sensing and GIS, Science Direct, Landscape and urban planning, vol. 78, pp. 322-333, 2006.
Xu et al., "Ensemble multi-instance multi-label learning approach for video annotation task," in ACMMM, 5 pages, 2011.
Xun et al., A survey on context learning, IEEE Transactions on Knowledge and Data Engineering, vol. 29, No. 1, pp. 38-56, 2017.
Yuan et al., Discriminative video pattern search for efficient action detection, IEEE Transactions on Pattern Analysis and Machine Intelligence, vol. 33, pp. 1728-1743, 2011.
Zhou et al., Pattern based sequence classification, IEEE Transactions on Knowledge and Data Engineering, vol. 28, No. 5, pp. 1285-1298, 2016.
Sanchez-Rodriguez et al., "A Low Complexity System Based on Multiple Weighted Decision Trees for Indoor Localization", Sensors 2015, 15, 14809-14829.
Rubwurm et al., "Temporal Vegetation Modelling using Long Short-Term Memory Networks for Crop Identification from Medium-Resolution Multi-Spectral Satellite Images", Proceedings of the IEEE Conference on Computer Vision and Pattern Recognition (CVPR) Workshops, 2017, pp. 11-19.

(56) References Cited

OTHER PUBLICATIONS

Prosecution history of corresponding U.S. Appl. No. 16/371,274 including: Office Action dated Nov. 2, 2020, Amendment dated Feb. 1, 2021 and Notice of Allowance dated Feb. 22, 2021.

* cited by examiner

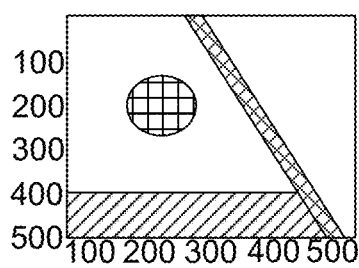
FIG. 12 (a)
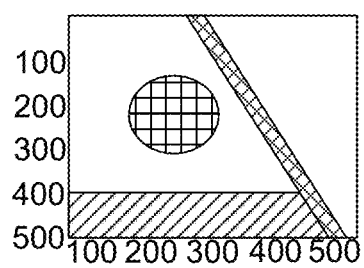
FIG. 12 (b)
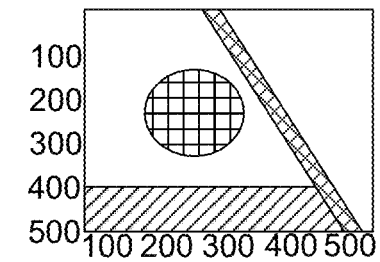
FIG. 12 (c)
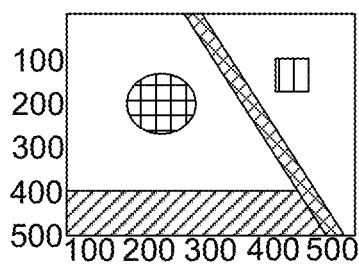
FIG. 12 (d)
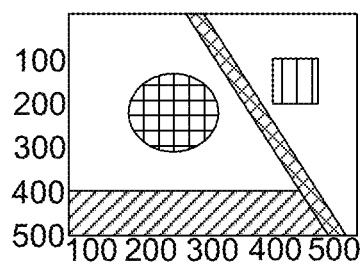
FIG. 12 (e)
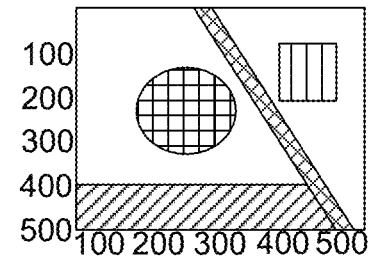
FIG. 12 (f)
FIG. 12

PREDICTING LAND COVERS FROM SATELLITE IMAGES USING TEMPORAL AND SPATIAL CONTEXTS

CROSS-REFERENCE TO RELATED APPLICATION

The present application is based on and claims the benefit of U.S. provisional patent application Ser. No. 62/650,816, filed Mar. 30, 2018, the content of which is hereby incorporated by reference in its entirety.

This invention was made with government support under 1029711 and 0905581 awarded by the National Science Foundation (NSF) and NNX12AP37G awarded by the National Aeronautics and Space Administration (NASA). The government has certain rights in the invention.

BACKGROUND

The need for discovering land use and land cover (LULC) changes is ever growing to understand the global environment and climate change. Detecting land use and land cover involves using satellites to collect image data of different areas around the globe and interpreting that image data to determine how the land is being used and/or the current land cover in the area such as Forest, Crop, Urban and Water, for example. In addition, the land cover assessment can identify areas that have recently burned or are currently burning.

The discussion above is merely provided for general background information and is not intended to be used as an aid in determining the scope of the claimed subject matter. The claimed subject matter is not limited to implementations that solve any or all disadvantages noted in the background.

SUMMARY

A method of identifying land cover includes receiving multi-spectral values for a plurality of locations at a plurality of times. A location is selected and for each time in the plurality of times, a latent representation of the multi-spectral values is determined based on a latent representation of multi-spectral values determined for a previous time and multi-spectral values for the previous time of a plurality of other locations that are near the selected location. The determined latent representation is then used to predict a land cover for the selected location at the time.

In accordance with a further embodiment, a method includes receiving features for a plurality of locations for a plurality of times. For a selected location and time, a long-term memory latent representation of the features is determined based on long-term memory parameters trained using features from a first number of previous time points, and a short-term memory latent representation of the features is determined based on short-term memory parameters trained using features from a second number of previous time points, wherein the second number is smaller than the first number. An output latent representation is selected from between the long-term memory latent representation and the short-term memory latent representation and is used to predict a land cover for the selected location at the time.

In a still further embodiment, an apparatus includes a memory and a processor. The memory contains a plurality of land cover vectors each for a respective land cover temporal transition pattern where the vectors together define a land cover temporal transition space. The processor receives multi-spectral values for a plurality of locations at a plurality of times. For a selected location and time, the processor determines a latent representation of the multi-spectral values based on a latent representation of multi-spectral values determined for a previous time and multi-spectral values for the previous time of a plurality of other locations that are near the selected location. The processor also determines a temporal feature from the latent representation wherein the temporal feature is in the land cover temporal transition space. The processor selects a land cover vector in the space that is closest to the temporal feature and assigns the selected location at the time to a land cover class associated with the selected land cover vector.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 12(a)-12(f) show changing synthetic images of a location over time used for testing in accordance with one embodiment.

DETAILED DESCRIPTION OF ILLUSTRATIVE EMBODIMENTS

1 Introduction

Figure 1A:
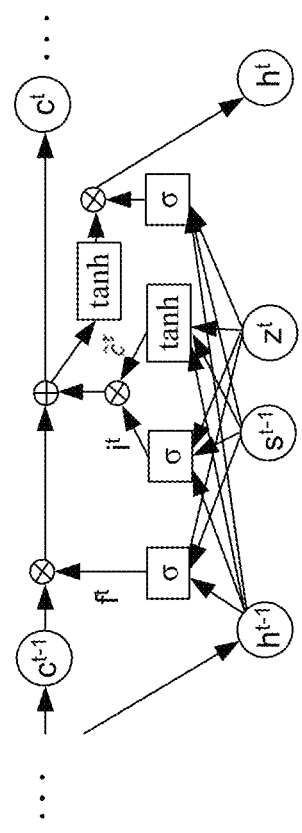
FIG. 1(a) is a state graph of spatio-temporal model based on RNN in accordance with one embodiment.

The monitoring of Land Use and Land Cover (LULC) changes necessitates the capacity of mapping land cover over large regions and over a long period.

Many existing land cover/land cover mapping products are manually created through visual interpretation, which takes advantage of human expertise in labeling process [P. Gunarso, M. E. Hartoyo, F. Agus, and others. 2013. RSPO, Kuala Lumpur, Malaysia. *Reports from the technical panels of the 2nd greenhouse gas working group of RSPO* (2013); RACHAEL Petersen, E D Goldman, N Harris, and others. 2016. *Mapping tree plantations with multispectral imagery: preliminary results for seven tropical countries. WRI* (2016). However, the limitations of this approach are manifold. First, manual labeling may result in both false positives and false negatives due to observational mistakes. Second, this approach usually requires multiple people to delineate land covers, likely resulting in inconsistency among observers. Most importantly, the required substantial human resources make it infeasible for large regions or for a long period. Due to these reasons, high-quality land cover products created by manual labeling are usually not available for many locations. In contrast, an automated monitoring system should be capable of conducting land cover prediction, which is the focus of this work. Specifically, a classification model is trained to learn the land cover patterns using manually created ground-truth in history, and then predicts land covers in more recent years when ground-truth is not available.

Compared with traditional classification problems, the land cover prediction process is severely plagued by data heterogeneity [Anuj Karpatne, Zhe Jiang, Ranga Raju Vatsavai, Shashi Shekhar, and Vipin Kumar, 2016, *Monitoring Land-Cover Changes: A Machine-Learning Perspective, IEEE Geoscience and Remote Sensing Magazine* (2016)]. Specifically, the data heterogeneity exists in several aspects. First, the spectral features of land covers are different in different regions. Therefore, a local model is usually trained on each target region [Anuj Karpatne, Zhe Jiang, Ranga Raju Vatsavai, Shashi Shekhar, and Vipin Kumar, *Monitoring Land-Cover Changes: A Machine-Learning Perspective, IEEE Geoscience and Remote Sensing Magazine* (2016); Guruprasad Nayak, Varun Mithal, and Vipin Kumar, *Multiple Instance Learning for burned area mapping using multi-temporal reflectance data*, (2016)]. Second, unseen/ novel land cover classes may appear during the prediction process. Considering a target region consisting of forests and crop-lands with available ground-truth before a time point, if some forest locations are converted to urban areas after the time point, the learned model cannot correctly predict land cover at these locations. Furthermore, the spectral features of each land cover usually change over years. Such temporal variation is mainly caused by the varying temperature, sunlight and precipitation over years, and potentially leads to misclassification. Furthermore, the traditional models are severely affected by the noise in spectral features, which is especially common in tropical areas. Due to these reasons, the model learned from previous years would perform poorly in the following years.

To overcome these challenges, one embodiment uses a predictive spatio-temporal model to mitigate these impacts from two aspects. First, the embodiment models the transition of land covers in our classification process. The transition modeling from both temporal and spatial perspectives assists not only in capturing the temporal variation, but also in alleviating the noise in spectral features by making temporally and spatially consistent classification. The transition modeling is further combined with deep learning methods to extract discriminative knowledge to distinguish different land covers. Second, we introduce an incremental learning strategy that updates model parameters in the prediction process. More specifically, we utilize a sliding window to incorporate latest spectral features and adapt the model to the temporal variation. An EM-style algorithm is then proposed to update the model parameters as we move the sliding window.

In a further embodiment, multiple types of features are combined into a classification model. In particular, these embodiments extract seasonal features and spatial context features from the multi-spectral data at each location, and then project these features to the temporal features of corresponding land cover. The temporal features are extracted from a large set of observed land cover series and constitute a "semantic" temporal feature space so as to allow unseen land cover classes to be related to the temporal feature space and identify them.

Then we integrate this learning approach into a long-short term memory (LSTM) model, which aims to conduct prediction on land covers at each time step, while also learning the transitions among land covers. To better capture the land cover transitions and temporal variation patterns, some embodiments extend the conventional LSTM using a dual-memory structure. In particular, such embodiments partition the transition and variation knowledge into a long-term memory and a short-term memory. The long-term memory is responsible for preserving the information from long history while the short-term memory can capture the patterns in more recent time steps. During the prediction process, the embodiments incrementally update the dual-memory structure via an Expectation-Maximization (EM) process. Besides, the embodiments refine the temporal features of land cover classes as time progresses. On one hand, such update process can reduce the impact of temporal variation. On the other hand, the refinement on land cover classes can mitigate the projection shift that occurs on unseen classes.

We extensively evaluate the performance of our proposed framework on synthetic and real-world datasets. The validation confirms the effectiveness of our proposed methods in tackling temporal variation and in identifying both existing and unseen land cover classes. Moreover, we compare the generated product by our framework to the existing manually created plantation product in Indonesia, and demonstrate that our framework ensures better quality.

2 Problem Definition

In this section, we formalize the land cover prediction problem and introduce involved notation. In particular, we focus on a set of N locations/pixels, indexed by i=1 to N. For each location i, we have its features at T+m time steps (i.e. years), $z_i = \{z_i^1, z_i^2, \ldots, z_i^T, z_i^{T+1}, \ldots, z_i^{T+m}\}$ where each $z_i^t$ is a vector of multi-spectral values detected by a camera at time t for location i, for i=1 to N, with each dimension of the vector representing a reflectance value at a specific bandwidth. In our method discussion we omit the index i when it causes no ambiguity. Besides, to utilize the spatial context information, we represent the neighborhood of location i as N(i). It is noteworthy that the neighborhood can be adjusted in different applications. In one embodiment, N(i) is defined to be the set of locations within a 1500 m by 1500 m squared range centered at $i^{th}$ location. In addition, ground-truth labels are available for each location i from t=1 to T, denoted as $l_i = \{l_i^1, \ldots, l_i^T\}$.

In accordance with one embodiment, a predictive classification model that produces label predictions $o_i = \{o_i^1, \ldots, o_i^T\}$ is initially trained using the available ground-truth from the time step 1 to T. Once the initial model has been trained, it is incrementally retrained by first using the existing model to predict a label for a next time point, such as T+1, accepting this predicted label as being accurate, then using a window containing ground truth labels and previously predicted and accepted labels to retrain the model parameters to minimize a difference between predicted labels and the ground truth and accepted labels in the window. Thus, a separate version of the model is produced for each time point from time T+1 to time T+m. Ultimately, the predictive classification models produce label predictions for each time point from time T+1 to time T+m.

2 Challenges

In land cover prediction, traditional classification models are crippled by the temporal variation. Given a location i with a fixed land cover, it may still have different multi-spectral values $z_i^t$ in different years due to changes in precipitation, sunlight, and temperature. Therefore the land cover patterns after T may not conform to the learned patterns before T, which degrades the classification performance from T+1 to T+m.

Moreover, as the multi-spectral values greatly change over space [Anuj Karpatne, Zhe Jiang, Ranga Raju Vatsavai, Shashi Shekhar, and Vipin Kumar. 2016. Monitoring Land-Cover Changes: A Machine-Learning Perspective. *IEEE Geoscience and Remote Sensing Magazine* (2016)], the classification model is expected to be trained locally on the target region. Hence, the available ground-truth in the target region may contain limited number of land covers and may not cover all the land covers that would appear after T. For example, if some forest locations convert to plantations after T while no plantation exists in this region before T, the learned model cannot identify plantations.

Finally, the multi-spectral values contain much noise due to natural disturbances (e.g. cloud, fog, smoke, etc.) and data acquisition errors. The multi-spectral values collected in each year also show seasonal cyclic changes.

3 Method

Single-Memory LSTM

In this section, we first introduce our proposed spatio-temporal framework. Then based on the proposed framework, we discuss the extraction of spatial context features.

3.1 Spatio-Temporal Modeling

Rather than focusing on a single location or time step, we propose to combine both spatial and temporal information in a unified framework. The spatio-temporal information can assist in discovering land covers in the following aspects:

1. Different land covers have different temporal transition patterns. For instance, forests can be logged and then get converted to croplands/urban area while the opposite transitions from croplands/urban area to forest rarely happen.

2. The spatial context can provide useful insights into the expansion/shrinkage of a specific land cover. For instance, the new plantations/croplands are usually cultivated around the existing plantations/croplands. Some land covers caused by external factors, e.g. burned areas caused by forest fire, are also likely to propagate to surrounding locations.

3. Due to the noisy multi-spectral values, the classification separately conducted on each individual location at each time step frequently leads to classification errors. By combining the spatio-temporal information, we can mitigate the noise and make the classification outputs consistent over space and over time.

Recent advances in deep learning models enable automatic extraction of discriminative knowledge from multi-spectral features thus to better distinguish different land covers. In this embodiment, variants of two deep learning models—Recurrent Neural Network (RNN) and Long Short-term Memory (LSTM)—are created to incorporate both spatial and temporal information. Since LSTM is in effect a special and extended version of RNN, we first introduce our proposed framework based on RNN, which is depicted in FIG. 1(a).

Given the noisy multi-spectral features in complex high-dimensional feature space, we wish to learn a more discriminative representation to recognize our desired land cover classes. Therefore we introduce the latent representation $h^t$, which is mapped from the input features through a weight matrix $W^z$. Besides, we include the temporal and spatial dependence to generate the hidden representation $h^t$ at time step t. More formally, we generate $h^t$ using the following equation. Hereinafter we omit the subscript index i when it causes no ambiguity.

$$h^t = \tan h(W^h h^{t-1} + W^z z^t + W^s s^{t-1}) \quad (3.1)$$

where $W^h$, $W^z$ and $W^s$ represent the weight matrices that connect $h^t$ to $h^{t-1}$, $z^t$, and $s^{t-1}$ respectively, and $s^{t-1}$ denotes the spatial context features at time t−1. Here the bias terms are omitted as they can be absorbed into the weight matrix.

We can observe that both $h^{t-1}$ and $s^{t-1}$ are utilized to generate $h^t$. On one hand, $W^h$ aims to capture the transition from a temporal perspective. For instance, "forest→cropland" is more likely to occur than "forest→water". On the other hand, the weight matrix $W^s$ is utilized to learn the relation between the spatial context at t−1 and the land cover at t. A target location is more likely to convert to certain land covers (e.g. plantation, cropland and burned area) if there exist such land covers in the neighborhood at t−1. More importantly, the spatial dynamics of land covers also depend on the properties of surrounding locations, e.g., burned area is more likely to propagate along the direction of high greenness level. Therefore we extract spatial context features from the neighborhood locations at t−1 to guide the spatial dynamics.

Based on $h^t$, we can classify the land covers at each time step t using a softmax function:

$$p(o^t) = \text{softmax}(Uh^t) \quad (3.2)$$

where U is the weight matrix between $h^t$ and the classification output $o^t$. The model can be easily extended to deep structure [I. Sutskever. Training recurrent neural networks.

PhD thesis, University of Toronto, 2013] and the parameters can be estimated by back-propagation algorithm.

Figure 1B:
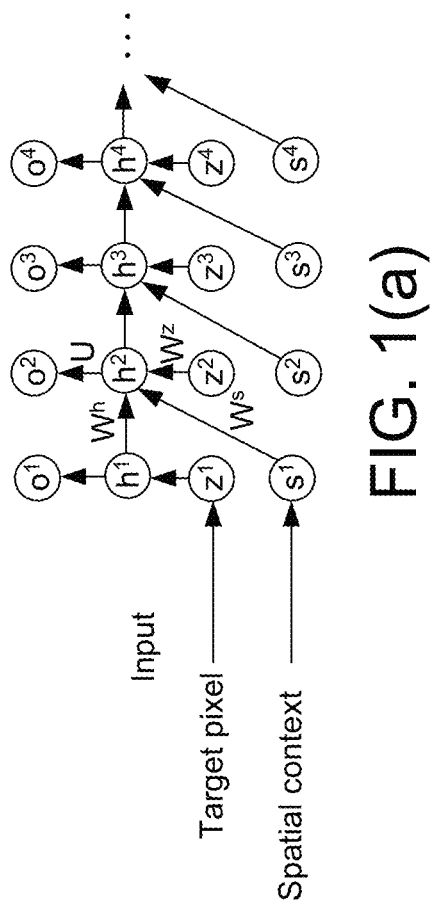
FIG. 1(b) is a variant of a LSTM cell used in accordance with one embodiment.

While RNN-based method can model the land cover transition and classify the land cover types, it gradually loses the connection to long history as time progresses [Y. Bengio, P. Simard, and P. Frasconi. Learning long-term dependencies with gradient descent is difficult. *IEEE transactions on neural networks*, 1994]. Therefore RNN-based method may fail to grasp the transition pattern for some long-term cyclical events such as El Niño. To this end we also propose a variant of LSTM to classify land cover types. LSTM is better in modeling long-term dependencies where each time step needs more contextual information from the past. The difference between our proposed LSTM and RNN-based models only lies in the generation of hidden representation $h^t$. In LSTM-based model, the input feature and $h^t$ are connected via an LSTM cell, as shown in FIG. 1(b).

Here we briefly introduce the LSTM cell in our proposed method. Each LSTM cell contains a cell state $c^t$, which serves as a memory and forces the hidden variables $h^t$ to reserve information from the past. To generate the cell state $c^t$, we combine the cell state $c^{t-1}$ at $t-1$ and the information at current time step. The transition of cell state over time forms a memory flow, which enables the modeling of long-term dependencies.

Specifically, we first generate a new candidate cell state $\tilde{c}^t$ by combining the input features $x^t$, the previous hidden layer $h^{t-1}$ and the spatial context features $s^{t-1}$ into a $\tan h(\cdot)$ function, as follows:

$$\tilde{c}^t = \tan h(W_h^c h^{t-1} + W_z^c z^t + W_s^c s^{t-1}) \qquad (3.3)$$

where $W_h^c$, $W_z^x$, and $W_s^c$ denote the weight parameters used to generate candidate cell state. Then a forget gate layer and an input gate layer are generated as follows:

$$f^t = \sigma(W_h^f h^{t-1} + W_z^f z^t + W_s^f s^{t-1}),$$

$$i^t = \sigma(W_h^i h^{t-1} + W_z^i z^t + W_s^i s^{t-1}) \qquad (3.4)$$

where $\{W_h^f, W_z^f, W_s^f\}$ and $\{W_h^i, W_z^i, W_s^i\}$ denote two sets of weight parameters for generating forget gate layer $f$ and input gate layer $i^t$, respectively. $\sigma(\cdot)$ denotes the sigmoid function, and therefore each entry in the forget/input gate layer ranges in [0,1]. The forget gate layer is used to filter the information inherited from $c^{t-1}$, and the input gate layer is used to filter the candidate cell state at time t. In this way we obtain the new cell state $c^t$ as follows:

$$c^t = f^t \otimes c^{t-1} + i^t \otimes \tilde{c}^t \qquad (3.5)$$

where $\otimes$ denotes entry-wise product.

Finally, the hidden representation is generated using a hidden gate layer $e^t$ and the obtain cell state, as:

$$e^t = \sigma(W_h^e h^{t-1} + W_z^e z^t + W_s^e s^{t-1}),$$

$$h^t = e^t \otimes \tan h(c^t) \qquad (3.6)$$

where $W_h^e$, $W_z^e$ and $W_s^e$ are weight parameters that are used to generate hidden gate layer, which determines the information to output from $c^t$ to $h^t$.

3.2 Spatial Context Feature Extraction

We include spatial context features in the proposed model mainly for two reasons. First, the spatial contextual knowledge can provide useful insights into land cover transitions. For instance, new croplands are usually cultivated around existing croplands. Second, since the locations of a specific land cover are usually contiguous over space, we can mitigate noisy multi-spectral features by making classification consistent over space. While there exist a variety of unsupervised feature extraction methods that aim to learn a representative feature space [I. Jolliffe. *Principal component analysis*. Wiley Online Library, 2002; M. Norouzi, M. Ranjbar, and G. Mori. Stacks of convolutional restricted boltzmann machines for shift-invariant feature learning. In CVPR, 2009], the generated embeddings from these methods do not contain enough discriminative knowledge. Since the spatial context features are associated with land cover transitions, the extraction process should be more related with the supervised information of land cover transitions. For instance, the spatial context features of "forest→forest" and "forest→plantation" should be different.

In our extraction method, the input for $i^{th}$ location is the raw multi-spectral values of the locations in the neighborhood $N(i)$ at time t, and we wish to learn a nonlinear mapping with parameter $\gamma$ to the spatial context features $s_i^t$. To learn $\gamma$, we first define a probabilistic distribution similar with Neighborhood Component Analysis [Jacob Goldberger, Geoffrey E Hinton, Sam T Roweis, and Ruslan Salakhutdinov. 2004. Neighbourhood components analysis.]. For each location i, it connects to another location j with a probability as:

$$p_{ij} = \frac{\exp(-d_{ij}^2)}{\sum_{j'} \exp(-d_{ij'}^2)} \qquad (3.7)$$

where $d_{ij}$ is the Euclidean distance between $s_i^t$ and $s_j^t$.

On the other hand, we define a target distribution using land cover labels, as follows:

$$q_{ij} = \frac{\exp(-\rho_{ij}^2)}{\sum_{j'} \exp(-\rho_{ij'}^2)} \qquad (3.8)$$

The target distance function $\rho_{ij}$ is defined using the supervised label information, as follows:

$$\rho_{ij} = \begin{cases} \infty, & l_i^t \neq l_j^t \,\&\, l_i^{t+1} \neq l_j^{t+1}, \\ \max(\delta_i, \delta_j)\sqrt{(d_y^t)^2 + (d_y^{t+1})^2}, & \text{otherwise,} \end{cases} \qquad (3.9)$$

where the label $l^t$ is in one-hot representation and where $d_y^t = \|l_i^t - l_j^t\|$ is the Euclidean distance between the one-hot vectors for labels $l_i^t$ and $l_j^t$. $\delta_i = p(l_i^{t+1} | l_i^t)$ is a measure of the fraction of locations with label $l_i^t$ at time t to be converted to $l_i^{t+1}$ at t+1, or the popularity of this transition. Since popular transitions are usually more interesting, in Eq. 3.9 we set a larger target distance between popular transitions and other transitions using $\delta_i$ and $\delta_j$.

Our objective is to minimize the Kullback-Leibler (KL) divergence between our defined distribution p using $s^t$ and the target distribution q. The gradient can be computed as:

$$\frac{\partial KL}{\partial \gamma} = \sum_i \frac{\partial KL}{\partial s_i^t} \frac{\partial s_i^t}{\partial \gamma} \propto -\sum_i \frac{\partial s_i^t}{\partial \gamma} \sum_j (s_i^t - s_j^t)(q_{ij} - p_{ij}). \qquad (3.10)$$

The derivative $$\frac{\partial s_i^t}{\partial \gamma}$$

can be estimated by back-propagation if we adopt a neural network structure to generate spatial context features. The computation of p and q can be time-consuming given large data size. In our implementation we cluster the data in each transition type and learn γ based on some sampled locations from each cluster. Then we extract spatial context features using the sampled locations.

3.3 Incremental Learning in Prediction

Given the learned model, an intuitive way to predict the label from T+1 to T+m is to recursively follow Eqs. 3.1 and 3.2. However, due to the temporal variation, many land covers frequently change their multi-spectral features over the years. Since the learned model does not incorporate the variation of multi-spectral features from T+1 to T+m, it may perform poorly when directly applied at these time steps. Therefore the model cannot be used by itself to predict the future land covers.

To conquer the temporal variation, one embodiment provides an incremental learning strategy. Basically, the model is updated with the latest multi-spectral features and becomes aware of the land cover transition in more recent years. For simplicity we discuss the prediction process using the RNN-based model, which, however, can be easily extended to LSTM-based model by replacing the generation of $h^t$.

The proposed incremental learning method can be summarized in an Expectation-Maximization (EM) process. In E-step we first generate the predicted label $o^{t+1}$ at next time step t+1, where t=T to T+m−1. Specifically, we sample the predicted label following a multinomial distribution $P(o^{t+1}|z^{1:t+1}; \theta)$, where θ denotes the model parameters learned from 1 to t, as follows:

$$h^{t+1} = \tan h(W^h h^t + W^z z^{t+1} W^s s^t),$$

$$o^{t+1} \sim \text{Mult}(\text{softmax}(Uh^{t+1})). \quad (3.11)$$

Figure 2:
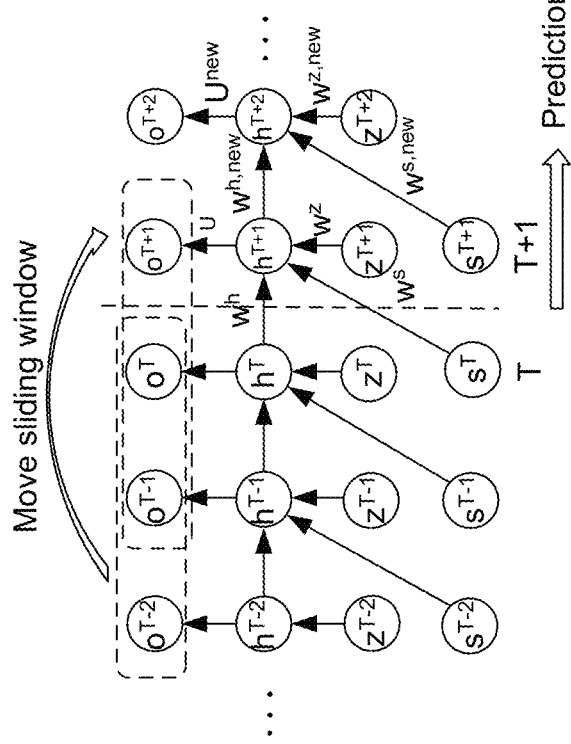
FIG. 2 is a state graph showing incremental learning in accordance with one embodiment.

Then in M-step, the embodiment first sets the predicted label as an accepted label $\hat{l}$, where we use $\hat{l}$ to distinguish the accepted labels from the provided labels l. The embodiment then utilizes a sliding temporal window with length w to capture the temporal variation. The sliding window aims to include the time steps that are representative for next prediction. We hold an assumption that the temporal variation between consecutive time steps is much smaller than the temporal variation against long history. Hence before we conduct prediction at t+2, we first move the sliding window to cover the time steps from t−w+2 to t+1. Then we update the model parameters using the samples in the sliding window. Here the label of t+1 is obtained from the prediction process in E-step. An example of update procedure from T+1 to T+2 is shown in FIG. 2. More formally, in M-step we update parameters as follows:

$$\theta^{new} = \arg\min_\theta L([l^{t-w+2:T}, \hat{l}^{T+1:t+1}], o^{t-w+2:t+1}) \quad (3.12)$$

where [·,·] denotes the concatenation of two sets of labels, L(·) denotes the cross-entropy loss function for softmax output. Basically, we wish to minimize the difference between the classification outputs $o^{t-w+2:t+1}$ and the provided labels and accepted labels in the sliding window. We can observe that when t−w+2 is greater than T, we rely simply on the accepted labels for updating the model without using provided ground-truth. The whole incremental learning process is depicted in Algorithm 1. The time complexity of the prediction process is O(κmN), where κ is a constant determined by the dimension of input features, spatial context features and hidden representation.

---

Algorithm 1 Incremental learning in prediction.

Input: $\{z^1, z^2, ..., z^T, z^{T+1}, ..., z^{T+m}\}$: A series of input multi-spectral features;
$\{l^1, ..., l^T\}$: A series of ground-truth labels.
The mapping to generate spatial features from multi-spectral values.
The learned model from t = 1 to T.
Output: $\{l^{T+1:T+m}\}$
1: for time step t ← T to T + m − 1 do
2:    Generate spatial context features $s^t$ from the input multi-spectral features.
3:    Estimate $o^{t+1}$ by Eq. 3.11.
4:    Move sliding window, set $o^{t+1}$ as accepted label $\hat{l}^{t+1}$ for training.
5:    Update model parameters by Eq. 3.12 using $l^{t-w+2:T}$, $\hat{l}^{T+1:t+1}$, $z^{t-w+2:t+1}$ and $s^{t-w+1:t}$.
6: end for

---

While the incremental learning strategy incorporates the multi-spectral features from recent years, it results in much computational cost before making prediction. Therefore in real applications with large data, we wish to avoid frequently updating parameters. In one embodiment, this is achieved by stopping the incremental learning at an early stage.

Specifically, we adopt a convergence rate (CR) metric in sequential labeling to determine the necessity of the incremental training at a particular time step t. To estimate convergence rate, we keep a small validation set and manually label the samples in it. The convergence rate is then computed as $\Sigma_{i \in vsl, t=T+1:T+m} \eta_{i,t}/(mn_v)$. Here $n_v$ denotes the number of locations in the validation set val, and m represents the number of time steps under prediction. $\eta_{i,t}$ is the probability for the $i^{th}$ instance to be correctly classified at $t^{th}$ time step in prediction.

We measure the convergence rate after each round of parameter update, and we will stop the incremental learning if the convergence rate is above a threshold. Then we directly apply the learned model to predict labels at the remaining time steps.

In a further embodiment, the model described above is modified to account for seasonal changes in the spectral reflectance, to allow for land cover labels that are not present in the ground truth labels of a particular location, and to account for differences between locations that follow long-term variations patterns and locations that follow short-term variation patterns.

3.4 Seasonal Features:

Seasonal patterns are important in characterizing land covers. If we take the multi-spectral features of a single date, it may be difficult to distinguish between a pair of land covers, e.g., a cropland just after harvest would look very similar to a barren land.

Figure 3:
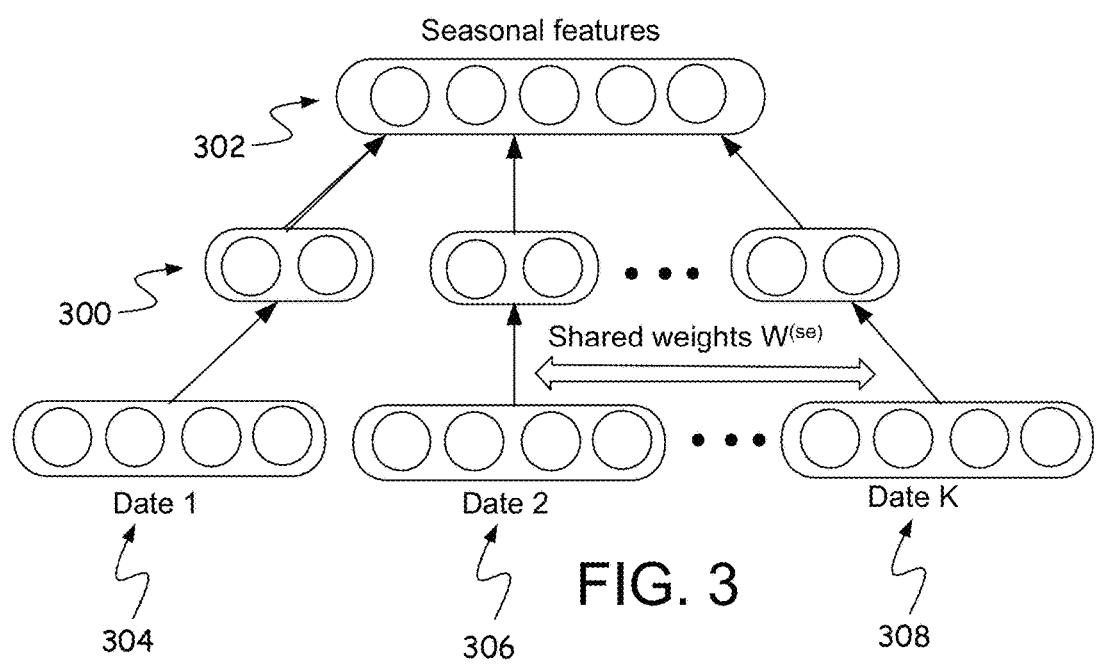
FIG. 3 is a schematic diagram of a two-layer neural network which combines multiple dates to generate seasonal features.

In accordance with one embodiment, the collected multi-spectral features from multiple dates of a year are applied to two-layer neural networks to extract seasonal features, as shown in FIG. 3. The first layer 300 is responsible for combining different dimensions (i.e. bandwidth) of multi-spectral data to generate discriminative features on each date via a weight matrix $W^{(se)}$. It is noteworthy that $W^{(se)}$ is shared among different dates. Then the extracted features from multiple dates are taken as input to the second layer 302, which combines the features from different dates 304, 306, and 308, for example, via a weight matrix V. Specifically, this process at a time step/year t can be expressed as follows:

$$x^{t,(d)} = \sigma(W^{(se)} z^{t,(d)}),$$

$$x^t = \sigma(V[x^{(t,d=1:D)}]), \quad (3.13)$$

where $z^{t,(d)}$ and $x^{t,(d)}$ denote the multi-spectral features and the extracted features on each date d, and $\sigma(\cdot)$ and $[\cdot]$ denote a sigmoid function and a concatenation function, respectively. The involved parameters are computed when training the whole framework.

3.5 Zero-Shot Learning Model

In land cover prediction problem, if we represent the set of land cover classes contained by ground-truth in the target region as $\mathcal{G}$ and the land cover classes that appear after T as $\mathcal{P}$, then it is possible that $\mathcal{P}\backslash\mathcal{G} \neq \emptyset$, where $\backslash$ denotes the set difference. Therefore we propose a customized zero-shot learning model, which aims to recognize each land cover class in $\mathcal{G}\cup\mathcal{P}$ even without labelled training samples.

In traditional zero-shot learning tasks such as visual recognition, a semantic space is first created using auxiliary information sources, e.g. large text corpus [Richard Socher, Milind Ganjoo, Christopher D Manning, and Andrew Ng, *Zero-shot learning through cross-modal transfer, Advances in neural information processing systems*. (2013)], which is independent to the provided ground-truth in visual recognition. The auxiliary sources contain sufficient knowledge thus to generate the semantic features for both existing and unseen classes. Then the goal of zero-shot learning is to learn the projection from input image features to the semantic features using the training set.

Figure 4:
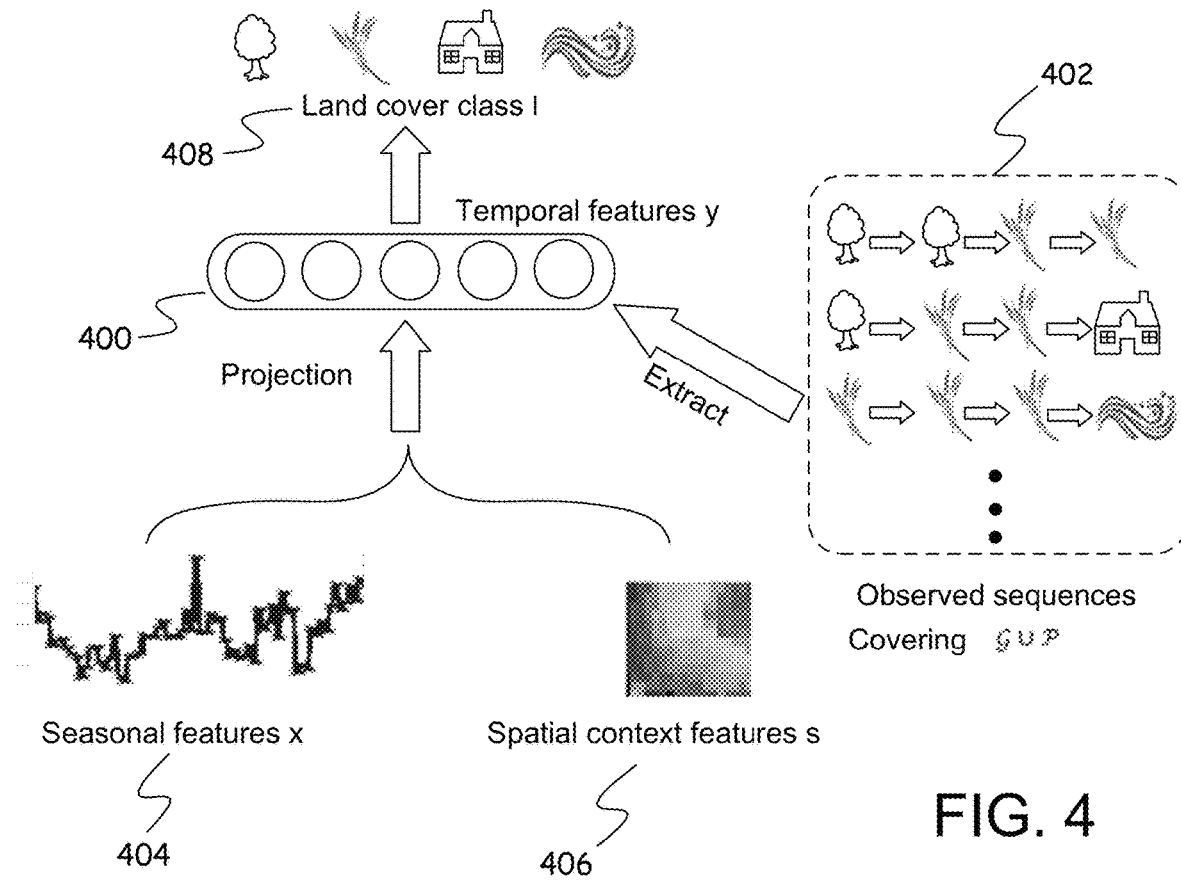
FIG. 4 is a schematic diagram of a zero-shot learning model in accordance with one embodiment.

In our problem, the raw multi-spectral features are in high dimensionality and contain much noise, and also we do not have large text corpus as auxiliary information sources. To this end, we propose to use temporal features y 400, extracted from observed land cover sequences 402 and projected from seasonal features x 404 and spatial context features s 406 as depicted in FIG. 4. Here we consider a particular time step and omit the super-script t.

We extract seasonal features and spatial context features to summarize the multi-spectral properties of each location as discussed above. On the other hand, we learn the temporal features for each land cover class in $\mathcal{G}\cup\mathcal{P}$ using a set of observed land cover series, which serves as auxiliary information and will be described later. Our objective here is to learn the projection from the seasonal features and spatial context features of each location to the temporal features of the corresponding land cover class. After learning this projection using the ground-truth, we apply it to generate temporal features y for each test location. Then we take the closest land cover class 408 to y in the temporal feature space as the final output. In this way we can identify both existing and unseen classes.

To illustrate the effectiveness of temporal features, we consider an example where the training set does not contain plantation locations. We assume two dimensions of the temporal features represent "whether this land cover is always converted from forest" and "whether this land cover will persist for a very long time". We have the knowledge from auxiliary sources that plantations have both these two properties, while the training set contains some land covers that have only one of these two properties. After learning the projection from input features to the temporal feature space using the training set, we can identify a plantation location if it reflects high values in these two dimensions. In practice, the extracted temporal features usually contain more abstract knowledge.

Temporal Features:

To identify both existing and unseen land covers, we need to guarantee that 1) we can obtain the temporal features of unseen land covers, and 2) the temporal features contain semantics so that the projection learned from training set can also be applied on unseen land covers.

Due to these reasons, one embodiment learns a distributed representation for each land cover using the Continuous Bag-of-words (CBOW) model, which is an effective "word2vec" method in learning the semantic representation in natural language processing [Tomas Mikolov, Kai Chen, Greg Corrado, and Jeffrey Dean, *Efficient estimation of word representations in vector space, arXiv preprint arXiv:* 1301.3781 (2013)]. In our problem, we treat each land cover as a word, and $\mathcal{G}\cup\mathcal{P}$ forms the vocabulary. To get the "corpus", we collect multiple land cover series from different locations over years, e.g. "forest→cropland→cropland→wasteland". While the land covers in $\mathcal{P}\backslash\mathcal{G}$ do not exist in the target region, we can always collect land cover series from other places that contain these unseen land covers. In implementation, we collect land cover series from different places that contain all the land covers defined by land cover taxonomy.

Although these land cover series are collected from different places, they share similar transition patterns, and are then used to train CBOW. In this way we learn the distributed representation for each land cover. In the generated semantic space, each land cover label is represented by a continuous-valued vector. According to the theory of CBOW, two land covers with similar temporal transition patterns stay closer in the semantic space. Therefore, we name this generated representation as temporal features.

When the temporal features are used, the spatial context features can be determined using the distance between the temporal features instead of the land cover labels. For each location pair i,j there is a probability:

$$p_{ij} = \frac{\exp(-d_{ij}^2)}{\sum_{j'} \exp(-d_{ij'}^2)} \quad (3.7)$$

where $d_{ij}$ is the Euclidean distance between $s_i^t$ and $s_j^t$.

On the other hand, we define a target distribution using land cover labels, as follows:

$$q_{ij} = \frac{\exp(-\rho_{ij}^2)}{\sum_{j'} \exp(-\rho_{ij'}^2)} \quad (3.8)$$

The target distance function $\rho_{ij}$ is defined using the supervised label information, as follows:

$$\rho_{ij} = \begin{cases} \infty, & l_i^t \neq l_j^t \ \& \ l_i^{t+1} \neq l_j^{t+1}, \\ \max(\delta_i, \delta_j)\sqrt{(d_y^t)^2 + (d_y^{t+1})^2}, & \text{otherwise,} \end{cases} \quad (3.9)$$

where $d_y^t = \|y_i^t - y_j^t\|$ is the Euclidean distance between temporal features $y_i^t$ and $y_j^t$, which corresponds to labels $l_i^t$ and $l_j^t$. Such temporal features are a vector representation of the land cover labels, allowing a distance to be computed based on differences between the individual dimensions of the temporal feature vectors. Such vector representations are referred to as zero-shot or one-shot representations since they are used in zero-shot and one-shot learning. $\delta_i = p(l_i^{t+1}|l_i^t)$ is a measure of the fraction of locations with label $l_i^t$ at time t to be converted to $l_i^{t+1}$ at t+1, or the popularity of this transition. Since popular transitions are usually more interesting, in Eq. 4 we set a larger target distance between popular transitions and other transitions using $\delta_i$ and $\delta_j$.

Our objective is to minimize the Kullback-Leibler (KL) divergence between our defined distribution p using $s^t$ and the target distribution q. The gradient can be computed as:

$$\frac{\partial KL}{\partial \gamma} = \sum_i \frac{\partial KL}{\partial s_i^t} \frac{\partial s_i^t}{\partial \gamma} \propto -\sum_i \frac{\partial s_i^t}{\partial \gamma} \sum_j (s_i^t - s_j^t)(q_{ij} - p_{ij}). \quad (3.10)$$

The derivative $$\frac{\partial s_i^t}{\partial \gamma}$$

can be estimated by back-propagation if we adopt a neural network structure to generate spatial context features. The computation of p and q can be time-consuming given large data size. In our implementation we cluster the data in each transition type and learn γ based on some sampled locations from each cluster. Then we extract spatial context features using the sampled locations.

3.6 Incremental Dual-Memory LSTM

In accordance with one embodiment, the LSTM model discussed above is extended with a dual-memory structure, which consists of long-term memory and short-term memory. The long-term memory is responsible for capturing long-term variation patterns from the long history, such as El Niño, while the short-term memory captures the environmental change during more recent time steps. The dual-memory structure is incrementally updated to learn the latest knowledge about the ever-changing environment, and also facilitates the land cover prediction. We refer to this modified LSTM to as Incremental Dual-memory LSTM (ID-LSTM).

We will first introduce a variant of LSTM model which learns the projection from seasonal features and spatial context features to temporal features. Then we further extend this model with a dual-memory structure. Finally, we will discuss the incremental update process.

3.2.1 Spatial LSTM.

Figure 5:
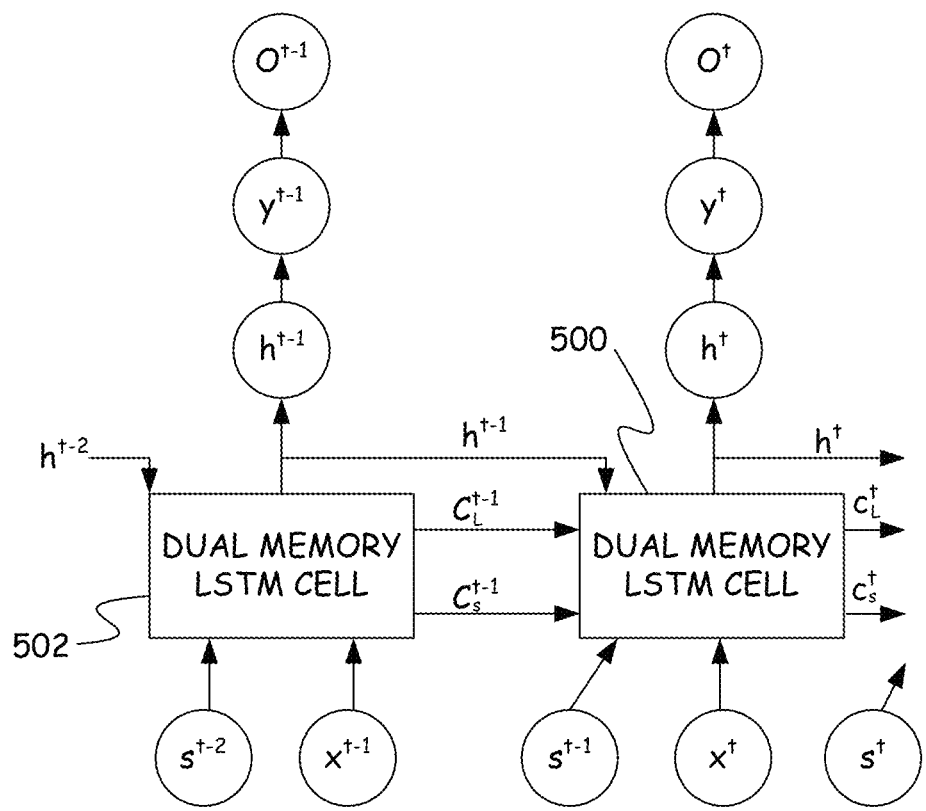
FIG. 5 is a state graph of a dual-memory embodiment.

FIG. 5 provides a variant of the LSTM model used in this embodiment. In this embodiment, a dual memory LSTM cell 500 receives the seasonal features $x^t$ for the current time point, the hidden representation $h^{t-1}$ determined by the dual memory LSTM cell of the previous time point, and the spatial context $s^{t-1}$ of the previous time point as well as a long-term memory cell state $c_L^{t-1}$ and a short-term memory cell state $c_S^{t-1}$ determined by the dual memory LSTM cell 502 of the previous time point. From these inputs, the dual memory LSTM generates the hidden representation $h^t$, the long-term memory cell state $c_L^t$, and the short-term memory cell state $c_S^t$ for the current time point t. The temporal features $y^t$ are then determined from the hidden representation using weight parameter U, as:

$$y^t = Uh^t \quad (3.14)$$

and the label $o^t$ is selected as:

$$o^t \leftarrow CL(y^t). \quad (3.15)$$

where $CL(\cdot)$ denotes the operation of selecting the closest land cover class to $y^t$ in the temporal feature space.

Dual-memory structure.

Figure 6:
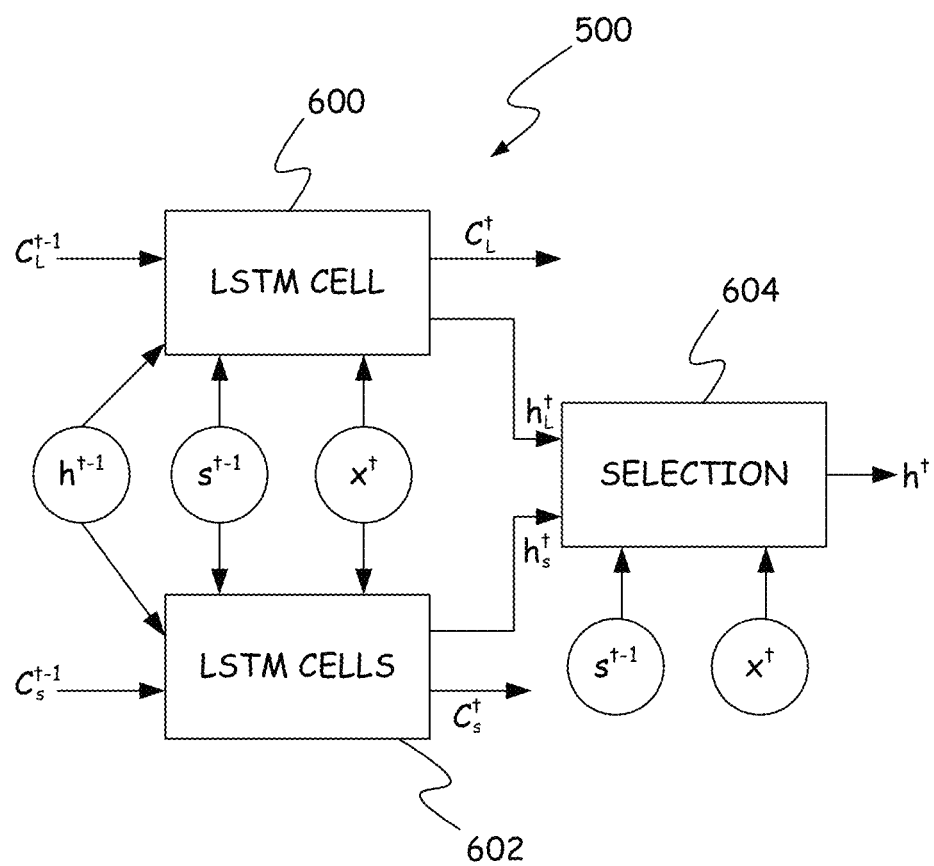
FIG. 6 is a state graph of a dual-memory LSTM cell in accordance with one embodiment.

The dual-memory LSTM 500 is shown in FIG. 6 and consists of long-term memory LSTM 600, a short-term memory LSTM 602, and a selection unit 604 that selects between the hidden representations $h_{(L)}^t$ and $h_{(S)}^t$ produced by the long-term memory LSTM 600 and the short-term memory LSTM 602. Long-term memory LSTM 600 receives the long-term memory cell state of the previous time point $c_{(L)}^{t-1}$ and generates the long-term memory cell state of the current time point $c_{(L)}^t$. Similarly, short-term memory LSTM 602 receives the short-term memory cells state of the previous time point $c_{(S)}^{t-1}$ and generates the short-term memory cell state of the current time point $s_{(S)}^t$. Considering the prediction at time step t+1, since the long-term memory is responsible for memorizing the pattern from long history, its time window covers time steps from 1 to t. In contrast, the short-term memory captures the recent w time steps before prediction, i.e. from t−w+1 to t.

Thus, this embodiment maintains two sets of cell states over time, $\{c_{(L)}^t\}$ and $\{c_{(S)}^t\}$, to store long-term information and short-term information. In accordance with one embodiment, both long-term memory LSTM 600 and short-term memory LSTM 602 have the same structure as the LSTM of FIG. 1(b) except that they utilize seasonal features x instead of multi-spectral values z and each LSTM has separate model parameters $\theta_{(L)} = \{W_{(L)}^c, W_{(L)}^f, W_{(L)}^i\}$ and $\theta_{(s)} = \{W_{(s)}^c, W_{(s)}^f, W_{(s)}^i\}$, but have shared weights $W^o$. Here we use the notation $W^* = \{W_x^*, W_s^*, W_h^*\}, \star = c/f/i/o$ for simplicity. The parameters $\theta_{(L)}$ and $\theta_{(s)}$ are learned using the samples in long-term memory and short-term memory, respectively.

Selection unit 604 selects between the long-term and short-term hidden representations by generating a new variable $\eta^t$ via parameters $\{P_x, P_s\}$ to determine which LSTM is used to generate $h^t$. In real-world applications, some locations tend to follow long-term variation patterns, while some other locations follow short-term environmental changes, depending on their multi-spectral properties and surrounding environment. Using $\eta^t$ to summarize these factors, the generative process can be described as follows:

$$\eta^t = \sigma(P_x x^t + P_s s^{t-1}) \quad (3.16)$$

$$h^t = \begin{cases} e^t \otimes \tanh(c_{(L)}^t), & \eta^t > 0.5, \\ e^t \otimes \tanh(c_{(s)}^t), & \text{otherwise}, \end{cases}$$

The involved parameters in the entire framework (including the parameters to generate seasonal features, the parameters in LSTM and the parameters in generating 11t) can be inferred using back-propagation algorithm.

Incremental Update.

The dual-memory LSTM model can be incrementally updated in the same way as the LSTM model discussed above. Specifically, the dual-memory LSTM model can be updated in a recursive EM-style process. In E-step, $h^{t+1}$ is estimated from the information at t by Eq. 3.16, and a label $o^{t+1}$ is predicted using Eqs. 3.14 and 3.15.

In the M-step, the predicted label $o^{t+1}$ is accepted as label $\hat{l}^{t+1}$ and then the time windows of long-term memory and short-term memory are moved forward. After this move, the long-term memory covers the time steps from 1 to t+1, and the short-term memory covers the time steps from t−w+2 to t+1. The long-term memory parameters $\theta_{(L)}$ and the short-term memory parameters $\theta_{(S)}$ are then updated using the samples in respective time windows, as follows:

$$\theta_{(L)}^{new} = argmin_{\theta_{(L)}} L(y^{1:t+1}, \{v(l^{1:T}), v(\hat{l}^{T+1:t+1})\})$$

$$\theta_{(S)}^{new} = argmin_{\theta_{(S)}} L(y^{(t-w+2:t+1}, \{v(l^{t-w+2:T}), v(\hat{l}^{T+1:t+1})\}) \quad (3.17)$$

where $\{\cdot,\cdot\}$ denotes the union of two sets of vectors, $L(\cdot)$ is the squared loss function, and v(l) denotes the temporal features associated with label l. Intuitively, we wish to minimize the difference between the predicted temporal features y and the temporal features associated with the obtained land cover labels in each time window.

After updating model parameters, we also refine the temporal features of each land cover. Specifically, we update the temporal features v(l) of each land cover l as the centroid of the predicted temporal features of all the locations in land cover l at t+1. Such update process can not only alleviate temporal variation, but also refine the projection to the unseen classes that appear during the prediction process.

As summarized in Algorithm 2, the incremental prediction process has a time cost of O(κmN), where κ is a constant determined by the dimensionality of our customized feature representation and hidden representation.

---

Algorithm 2 Incremental learning in prediction.

Input: $\{z^1, ..., z^T, z^{T+1}, ..., z^{T+m}\}$: A series of multi-spectral features: The learned model before T.
Output: $\{l^{T+1:T+m}\}$
1: for time step t ← T to T + m − 1 do
2:   Generate $x^{t+1}$ and $s^t$ from multi-spectral features.
3:   Estimate $l^{t+1}$ by Eqs. 3.14 and 3.15.
4:   Move the time windows, include $l^{t+1}$ as training labels.
5:   Update $\theta_{(L)}$ and $\theta_{(S)}$ by Eq. 3.17.
6:   Infer $y^{t+1}$ and $l^{t+1}$ for all locations at time t+1.
7:   Update the temporal features v(l) as the centroid of inferred $y^{t+1}$ of each land cover l.
8: end for

---

4 Experiments

Single Memory LSTM

The single memory LSTM embodiment was evaluated on two real applications—plantation monitoring in Indonesia and burned area detection in Montana state, US. Specifically, we utilize the 500-meter resolution MODIS data product, which consists of 7 reflectance bands collected by MODIS instruments onboard Aqua and Terra satellites. This product provides images at a global scale for every 8 days. For each year we take 15 most discriminative composite images according to domain knowledge (e.g. land covers are hardly distinguishable during winter). The 7-band multi-spectral features of the selected 15 images were concatenated as the yearly input for the learning model. Our goal is to predict yearly land cover labels during a specific period.

4.1 Oil Palm Plantation in Indonesia

The industry of oil palm plantation is a key driver for deforestation in Indonesia. Since oil palm plantations frequently have similar properties (e.g. greenness) with tropical forest, it is difficult to automatically monitor the plantation for long period. In our experiment we utilize two latest datasets—RSPO dataset [P. Gunarso, M. E. Hartoyo, F. Agus, Killeen, T. J., and J. Goon. *Roundtable on sustainable palm oil, Kuala Lumpur, Malaysia. Reports from the technical panels of the 2nd greenhouse gas working group of RSPO*, 2013] and Tree Plantation dataset [R. Petersen, E. Goldman, N. Harris, S. Sargent, D. Aksenov, A. Manisha, E. Esipova, V. Shevade, T. Loboda, N. Kuksina, et al. *Mapping tree plantations with multispectral imagery: preliminary results for seven tropical countries. World Resources Institute*, 2016] to create ground-truth. RSPO dataset labels each location as one of multiple pre-defined land cover types including oil palm, forest, grassland, etc. It is available on 2000, 2005, and 2009. In contrast, Tree Plantation dataset only labels plantation locations in 2014. We combine both two datasets and utilize Enhanced Vegetation Index (EVI) time series from 2001 to 2014 to manually create yearly ground-truth for 27,923 locations in Kalimantan region of Indonesia through 2001-2014. Each location is labeled as one of the categories from {"plantation", "forest", "other"}.

40% of the locations were used as training locations, and only the ground-truth of 2001 to 2009 were used for training. Another 20% of the locations were kept as a validation set for selecting hyper-parameters. The remaining 40% of the locations served as the test locations. The land cover prediction performance through 2010 to 2014 on both training locations and test locations was measured. The prediction performance is measured using F1-score and Area Under the Curve (AUC) of plantation class.

Artificial Neural Networks (ANN): In this baseline we train a global ANN model based on the training data from 2001 to 2009. Then we directly apply the learned model to predict the land covers during 2010-2014.

Recurrent Neural Networks (RNN): We train an RNN model using only the spectral features of training locations. Then we directly apply it for prediction.

RNN+spatial context features (sRNN): We combine the spectral features and the spatial context features into the RNN-based model, as described earlier. Then we use it for prediction.

sRNN+incremental learning (siRNN): We combine sRNN and incremental learning in prediction.

Long short-term memory (LSTM): Here we train an LSTM model using only the spectral features of training locations. Then we apply it for prediction.

Convolutional long short-term memory (cvL-STM): Rather than extracting spatial context features, we directly utilize the spectral features from the neighborhood at t−1 as $s^{t-1}$. This is equivalent to learning a convolutional model on the neighborhood of each location at t−1, but replacing the target location with its spectral features at t.

LSTM+spatial context features (sLSTM): Similar with sRNN, we combine the spatial context features and LSTM, and directly use it for prediction.

sLSTM+incremental learning (siLSTM): We combine sLSTM and incremental learning in prediction.

We show the performance of each method on both training and test locations in Table 1. It can be observed that siLSTM model brings around 33% improvement than ANN model, which lies in the ignorance of spatio-temporal information by ANN. The comparison between the methods with and without spatial context features (sRNN vs. RNN, sLSTM vs. LSTM) clearly reveals the advantage brought by the spatial context information. The improvement from cvLSTM to sLSTM also demonstrates the effectiveness of our method in extracting spatial context features. In cvLSTM, the training process is dominated by large amount of spectral features from the neighborhood while ignoring the information from the target location. On the other hand, the use of incremental learning leads to a significant improvement from sRNN/sLSTM to siRNN/siLSTM with w=5. Moreover, by modeling land cover transition, the methods other than ANN result in less difference between training and test locations. Finally the result reveals the superiority of LSTM based model over RNN based model, which mainly stems from the capacity of LSTM in reserving long-term memory and in modeling more complex transition relationship.

variables. The large number of hidden variables will lead to overfitting while too few hidden variables lack the capacity to well model the transition.

Another interesting finding from Table 1 is that the reduction of AUC over time is not as much as the reduction of F1-score. Therefore we conclude that as time progresses, most plantation locations still have larger probability to be classified as plantation than the other non-plantation locations. However, the plantation class gradually gets confused with other classes and the absolute probability value decreases. Such phenomenon can be utilized to validate the effectiveness of proposed incremental learning strategy. In particular, we measure the average confidence on the real plantation locations over the years. Here the confidence denotes the probability for our model to classify each location as plantation, which can be obtained from softmax output. We show the average confidence computed using sRNN, siRNN, sLSTM and siLSTM, in FIG. 7($b$). By

TABLE 1

The plantation performance of each method in 2010-2014, measured in F1-score (AUC). The prediction is conducted on both training locations and test locations.

| Method | Set | 2010 | 2011 | 2012 | 2013 | 2014 |
|---|---|---|---|---|---|---|
| ANN | train | 0.838 (0.767) | 0.724 (0.738) | 0.714 (0.718) | 0.684 (0.695) | 0.677 (0.693) |
|  | test | 0.772 (0.732) | 0.703 (0.706) | 0.678 (0.702) | 0.647 (0.680) | 0.643 (0.677) |
| RNN | train | 0.876 (0.773) | 0.807 (0.758) | 0.738 (0.741) | 0.715 (0.708) | 0.703 (0.695) |
|  | test | 0.866 (0.770) | 0.797 (0.758) | 0.736 (0.730) | 0.695 (0.701) | 0.690 (0.693) |
| sRNN | train | 0.902 (0.787) | 0.830 (0.761) | 0.769 (0.749) | 0.752 (0.746) | 0.720 (0.742) |
|  | test | 0.898 (0.784) | 0.816 (0.761) | 0.746 (0.727) | 0.738 (0.745) | 0.719 (0.731) |
| siRNN | train | 0.902 (0.787) | 0.852 (0.767) | 0.804 (0.763) | 0.795 (0.751) | 0.768 (0.756) |
|  | test | 0.898 (0.784) | 0.863 (0.765) | 0.797 (0.755) | 0.783 (0.750) | 0.769 (0.745) |
| LSTM | train | 0.885 (0.775) | 0.867 (0.757) | 0.817 (0.718) | 0.756 (0.704) | 0.771 (0.703) |
|  | test | 0.876 (0.780) | 0.870 (0.753) | 0.803 (0.701) | 0.761 (0.699) | 0.758 (0.692) |
| cvLSTM | train | 0.897 (0.783) | 0.880 (0.774) | 0.833 (0.762) | 0.797 (0.738) | 0.778 (0.726) |
|  | test | 0.889 (0.781) | 0.873 (0.769) | 0.844 (0.761) | 0.776 (0.729) | 0.763 (0.725) |
| sLSTM | train | 0.938 (0.820) | 0.922 (0.803) | 0.872 (0.782) | 0.831 (0.783) | 0.793 (0.765) |
|  | test | 0.937 (0.802) | 0.903 (0.782) | 0.867 (0.770) | 0.813 (0.762) | 0.794 (0.744) |
| siLSTM | train | 0.938 (0.820) | 0.937 (0.806) | 0.914 (0.798) | 0.911 (0.794) | 0.898 (0.781) |
|  | test | 0.937 (0.802) | 0.936 (0.805) | 0.919 (0.791) | 0.905 (0.792) | 0.895 (0.776) |

TABLE 2

The plantation prediction performance of each method in 2010-2014, measured in F1-score (AUC). Only the ground-truth during 2001-2005 is used in this test.

| Method | Set | 2010 | 2011 | 2012 | 2013 | 2014 |
|---|---|---|---|---|---|---|
| LSTM | train | 0.391 (0.741) | 0.409 (0.706) | 0.380 (0.664) | 0.286 (0.639) | 0.309 (0.650) |
|  | test | 0.385 (0.736) | 0.398 (0.695) | 0.355 (0.657) | 0.288 (0.637) | 0.282 (0.631) |
| cvLSTM | train | 0.452 (0.751) | 0.412 (0.706) | 0.369 (0.674) | 0.309 (0.637) | 0.355 (0.649) |
|  | test | 0.442 (0.740) | 0.406 (0.703) | 0.369 (0.673) | 0.306 (0.639) | 0.339 (0.640) |
| sLSTM | train | 0.464 (0.766) | 0.415 (0.727) | 0.405 (0.662) | 0.378 (0.680) | 0.390 (0.664) |
|  | test | 0.447 (0.754) | 0.405 (0.719) | 0.366 (0.680) | 0.360 (0.661) | 0.349 (0.667) |
| siLSTM | train | 0.587 (0.763) | 0.541 (0.699) | 0.544 (0.700) | 0.436 (0.667) | 0.423 (0.670) |
|  | test | 0.582 (0.761) | 0.541 (0.694) | 0.534 (0.700) | 0.397 (0.677) | 0.420 (0.649) |

It can also be observed that the prediction performance of each method decreases from 2010 to 2014, which is caused by the temporal variation. To better illustrate this, we retrain LSTM-based methods only using the ground-truth until 2005 and predict on 2010-2014. According to Table 2, the performance greatly drops compared to Table 1. However, siLSTM still out-performs other methods by a considerable margin.

Figure 7:
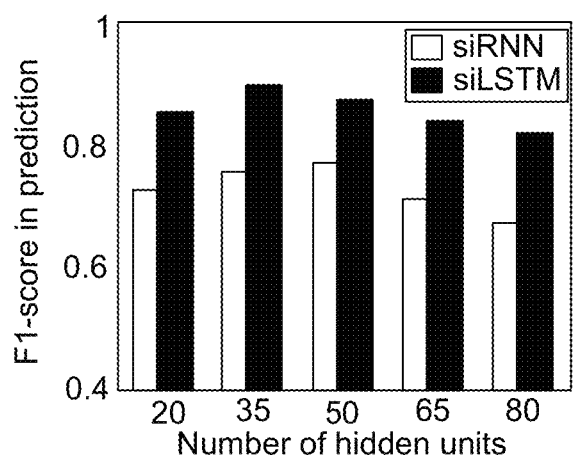
FIG. 7(a) is a graph of performance on test locations measured with different numbers of hidden variables.
FIG. 7(b) is a graph of the change of average confidence on real plantation locations over time for different models.
Figure 7:
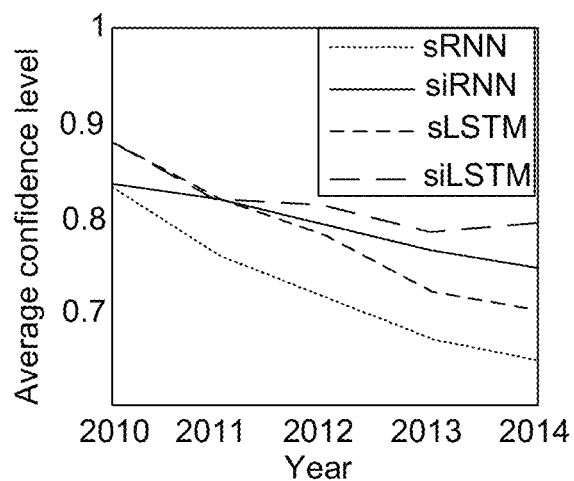

Then we evaluate how the capacity of hidden representation affects the performance. In FIG. 7($a$), we measure the performance in F1-score with different number of hidden incorporating latest information to update model in the prediction process, the incremental methods can better characterize the plantation class in recent years, and consequently result in higher confidence.

To show the efficacy of incremental learning after each round of parameter update, we measure CR after each year with incremental learning, as shown in Table 3. The CR value is measured through 2010-2014 using the validation set, and the initial value in 2009 does not involve incremental learning. It is clear that CR increases as the model incrementally learn new knowledge from 2010 to 2014, but shows limited improvement after 2012. Hence we can terminate the incremental learning after 2012 to save computational cost.

TABLE 3

The progression of CR in plantation detection as we incrementally update model over years.

| Methods | 2009 | 2010 | 2011 | 2012 | 2013 | 2014 |
|---------|------|------|------|------|------|------|
| siRNN   | 0.778 | 0.781 | 0.793 | 0.804 | 0.804 | 0.807 |
| siLSTM  | 0.786 | 0.882 | 0.918 | 0.930 | 0.933 | 0.934 |

Figure 8:
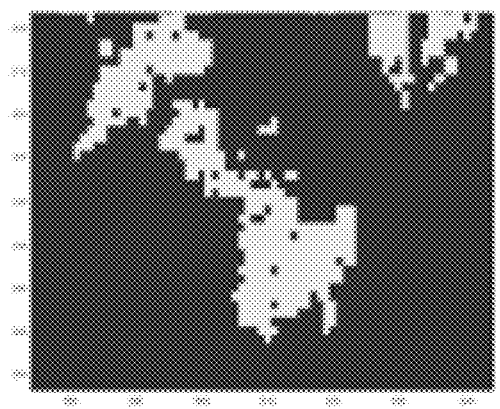
FIGS. 8(a) and 8(b) show graphs depicting plantation detection using sLSTM and ANN, respectively.
Figure 8:
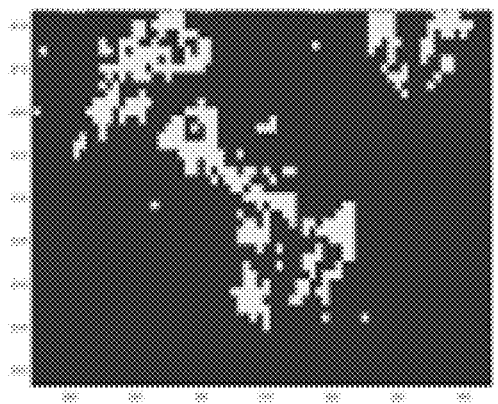
Figure 9:
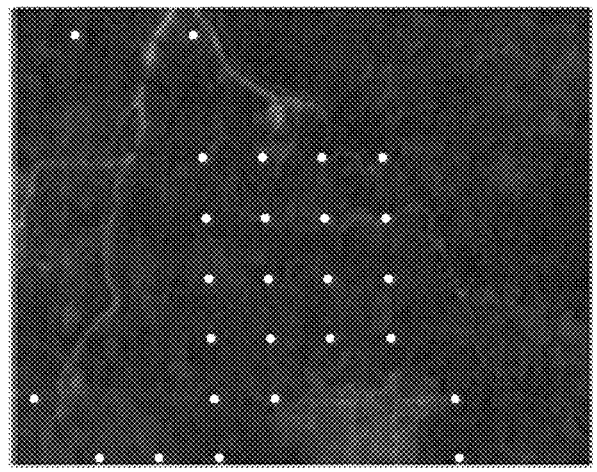
FIG. 9(a) shows an image with areas that were incorrectly labeled as plantation using manual labeling but was correctly labeled as forest using an embodiment.
FIG. 9(b) is a high resolution image of the region shown in FIG. 9(a).
Figure 9:
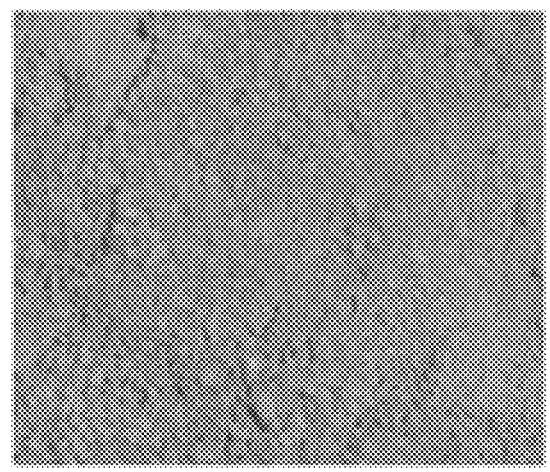

In FIG. 8, we show the efficacy of incorporating spatio-temporal information by an example region. FIGS. 8(a) and 8(b) show a region with detected plantations shown in light coloring where FIG. 8(a) shows the plantations detected using sLSTM and FIG. 8(b) showing the plantations detected using ANN. Compared to ANN, sLSTM generates more compact plantation regions and stays resistant to noisy labels. FIGS. 9(a) and 9(b) show a Google earth image and a high-resolution Digital Globe image of a region with light dots in FIG. 9(a) showing pixels that were correctly labeled as forest using the embodiment but that were hand-labeled as plantation. The high-resolution image of FIG. 9(b) verifies that this region is indeed forest.

4.2 Burned Area Detection in Montana

In this part we evaluate the single memory embodiment in detecting burned areas in Montana. We obtained fire validation data until 2009 from government agencies responsible for monitoring and managing forests and wildfires. Each burned location is associated with the time of burning. In total we select 15,107 MODIS locations and each location has a binary label of burned/not burned on every year from 2001 to 2009.

We divide the data in the same proportion with our test in plantation application. Here we train each method using the ground-truth until 2006 and predict on 2007-2009. From the results shown in Table 4, we can observe that the spatio-temporal information and the incremental learning bring considerable improvement. On the other hand, we can find that all the methods have low F1-scores in 2009. Such phenomenon lies in that the burned locations in 2009 are very few, and both precision and recall will be severely disturbed if the model makes any classification error.

TABLE 4

The prediction of burned area in 2007-2009, measured in F1-score (AUC).

| Method | Set | 2007 | 2008 | 2009 |
|--------|-----|------|------|------|
| ANN    | train | 0.844 (0.775) | 0.546 (0.842) | 0.059 (0.801) |
|        | test  | 0.786 (0.770) | 0.487 (0.830) | 0.059 (0.797) |
| RNN    | train | 0.901 (0.780) | 0.605 (0.955) | 0.084 (0.817) |
|        | test  | 0.866 (0.770) | 0.603 (0.969) | 0.057 (0.793) |
| sRNN   | train | 0.974 (0.790) | 0.643 (0.971) | 0.104 (0.821) |
|        | test  | 0.972 (0.780) | 0.641 (0.974) | 0.096 (0.815) |
| siRNN  | train | 0.974 (0.790) | 0.853 (0.995) | 0.232 (0.881) |
|        | test  | 0.972 (0.780) | 0.776 (0.994) | 0.204 (0.865) |
| LSTM   | train | 0.907 (0.781) | 0.629 (0.967) | 0.160 (0.818) |
|        | test  | 0.908 (0.781) | 0.616 (0.971) | 0.145 (0.796) |
| cvLSTM | train | 0.912 (0.794) | 0.714 (0.970) | 0.168 (0.826) |
|        | test  | 0.909 (0.792) | 0.705 (0.970) | 0.166 (0.806) |
| sLSTM  | train | 0.981 (0.800) | 0.820 (0.973) | 0.256 (0.841) |
|        | test  | 0.980 (0.792) | 0.804 (0.985) | 0.247 (0.816) |
| siLSTM | train | 0.981 (0.800) | 0.925 (0.997) | 0.357 (0.905) |
|        | test  | 0.980 (0.792) | 0.922 (0.997) | 0.325 (0.900) |

Figure 10:
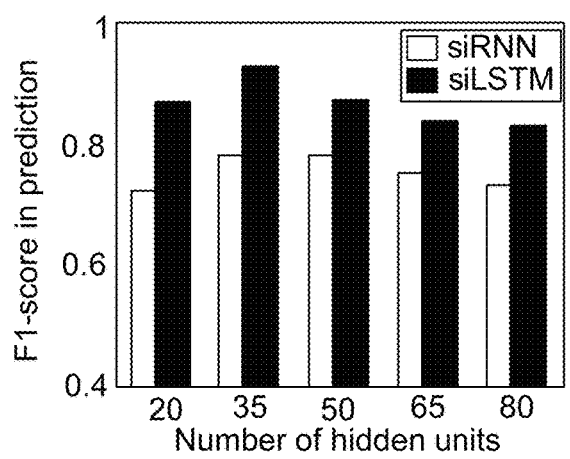
FIG. 10(a) is a graph of performance on test locations measured with different number of hidden variables.
FIG. 10(b) is a graph in change of average confidence on real burned locations over time for different models.
Figure 10:
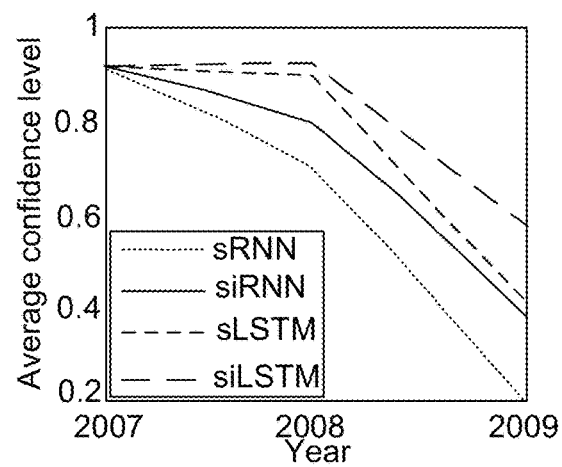

Similar to the plantation test, we measure the performance with different numbers of hidden variables, as displayed in FIG. 10(a). We obtain a similar hill-shaped pattern with that in plantation test. Then we validate the incremental learning method by measuring the change of average confidence, as shown in FIG. 10(b). We can see that the confidence of siRNN and siLSTM decrease slower than siRNN and siLSTM, respectively.

TABLE 5

The progression of CR in burned area detection as we conduct incremental learning over time.

| Methods | 2006 | 2007 | 2008 | 2009 |
|---------|------|------|------|------|
| siRNN   | 0.578 | 0.603 | 0.614 | 0.631 |
| siLSTM  | 0.649 | 0.677 | 0.683 | 0.697 |

Moreover, we show the progression of CR in Table 5. It is clear that every incremental learning step increases CR. Therefore we conclude that the temporal variation ubiquitously exists during 2007-2010 and we should not terminate incremental learning early.

Figure 11:
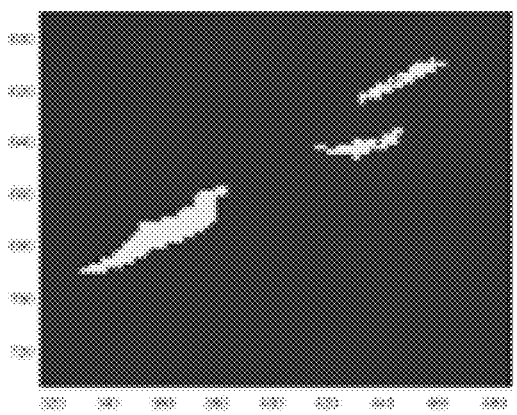
FIGS. 11(a) and 11(b) are graphs of a region with detected burned locations by sLSTM and ANN, respectively.
Figure 11:
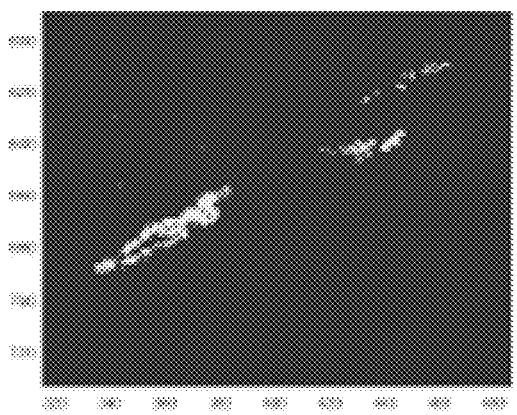

In FIGS. 11(a) and 11(b), we show an example region with detected burned areas in light coloring for sLSTM and ANN, respectively. The detected burned locations using sLSTM show a more spatially consistent pattern than the locations detected by ANN, since ANN suffers much from the noisy features and the temporal variation.

Dual-Memory LSTM

We also evaluated the Dual-Memory LSTM embodiments using both a synthetic dataset and real-world applications. In our evaluation, we utilized MODIS multi-spectral data as input spectral features. Specifically, we utilized the 500-meter resolution MODIS data product, which consists of 7 reflectance bands collected by MODIS instruments onboard NASA's satellites. This product provides images at a global scale for every 8 days. For each year we take 15 most discriminative images according to domain knowledge (e.g. land covers are hardly distinguishable during cloudy and winter seasons).

4.3 Synthetic Dataset

We first evaluated this embodiment on a synthetic dataset. Specifically, we created a virtual region which gradually changes over 20 time steps, as shown in FIGS. 12(a)-(f), which show the region at time steps 1, 5, 10, 11, 15 and 20, respectively. The created region contains five types of land covers: forest (white), cropland (square hash), urban area (vertical lines), water body (diagonal hash) and wasteland (diagonal lines). For the first 14 time steps, the spectral features of each location are the real spectral features of randomly selected locations in the corresponding land cover during 2001-2014. For time steps 15-20, we train a Dual-memory LSTM model to generate spectral features at each time step using the spectral features at previous time step.

We compare our method to several baselines in our tests:

Artificial Neural Networks (ANN): In this baseline we train a global ANN model using raw spectral features and provided labels from all the time steps.

Recurrent Neural Networks (RNN): We train an RNN model using raw spectral features and labels.

Long short-term memory (LSTM): Similarly, we train an LSTM model using raw spectral features and labels.

Spatial LSTM (sLSTM): We combine seasonal features and spatial context features in LSTM.

Incremental long-term memory (ilLSTM): Based on sLSTM, we conduct incremental learning using only long-term memory. The comparison between ilLSTM and ID-LSTM can reveal the effectiveness of dual-memory structure.

We evaluated this embodiment and the baselines in two tests. In Test 1, we trained each model using the first 10 time steps, and conducted prediction on the next 10 time steps. It is noteworthy that the class of "urban area" does not appear in the training set. In Test 2, we trained each model using the first 15 time steps, and then tested on the next 5 time steps. To populate the temporal features of each land cover type, we randomly collect land cover series from 100,000 locations from Southeast Asia from 2001 to 2014. In all the following tests we set the window size w=4 according to domain knowledge and the performance on a validation set.

Figure 13:
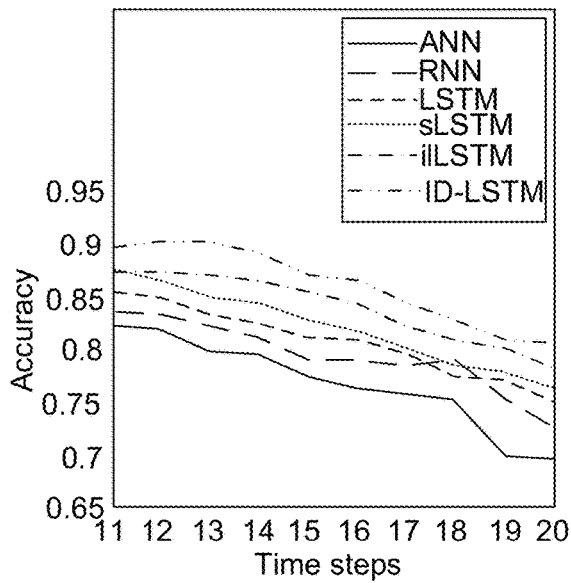
FIGS. 13(a) and 13(b) show graphs of prediction performance (accuracy) in tests of different lengths.
Figure 13:
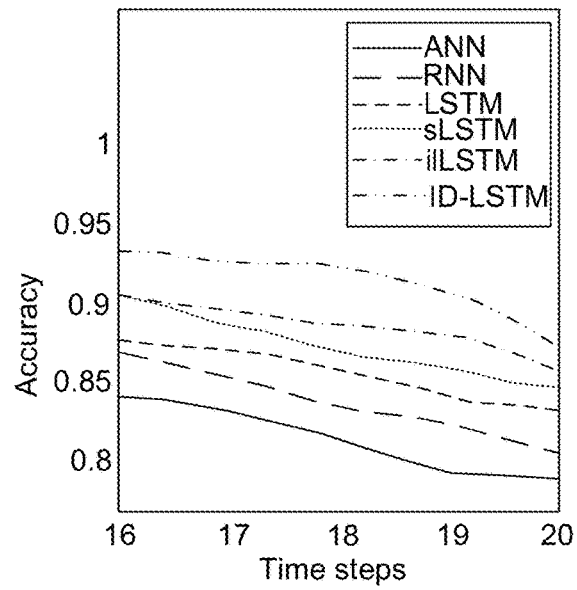

We show the classification performances of the dual-memory embodiment and the baseline methods in the two tests in FIGS. 13(a) and 13(b), respectively. It is clear that the classification accuracy of all the methods decreases over time due to the temporal variation. However, we can observe that ID-LSTM and ilLSTM decrease much slower than the other methods, especially at first several time steps. As time progresses, the accumulated temporal variation results in poor performance for all the methods. Compared to ilLSTM, the improvement made by ID-LSTM mainly stems from its capacity in capturing more recent variation patterns.

TABLE 5

Performance (F1-score on urban area and cropland) in Test 1 at time step 11-20 on synthetic data

| Method | Class | 11 | 12 | 13 | 14 | 15 | 16 | 17 | 18 | 19 | 20 |
|---|---|---|---|---|---|---|---|---|---|---|---|
| ANN | urban | 0.773 | 0.764 | 0.743 | 0.726 | 0.701 | 0.702 | 0.688 | 0.677 | 0.673 | 0.664 |
|  | crop | 0.825 | 0.820 | 0.812 | 0.808 | 0.776 | 0.758 | 0.757 | 0.754 | 0.733 | 0.716 |
| RNN | urban | 0.788 | 0.769 | 0.753 | 0.752 | 0.738 | 0.723 | 0.725 | 0.721 | 0.716 | 0.704 |
|  | crop | 0.838 | 0.832 | 0.825 | 0.815 | 0.791 | 0.790 | 0.788 | 0.782 | 0.748 | 0.748 |
| LSTM | urban | 0.802 | 0.778 | 0.762 | 0.752 | 0.757 | 0.746 | 0.737 | 0.732 | 0.728 | 0.719 |
|  | crop | 0.853 | 0.850 | 0.837 | 0.828 | 0.817 | 0.802 | 0.790 | 0.764 | 0.767 | 0.753 |
| sLSTM | urban | 0.818 | 0.792 | 0.779 | 0.766 | 0.761 | 0.755 | 0.749 | 0.740 | 0.733 | 0.728 |
|  | crop | 0.873 | 0.868 | 0.851 | 0.844 | 0.830 | 0.815 | 0.808 | 0.784 | 0.773 | 0.762 |
| ilLSTM | urban | 0.818 | 0.812 | 0.807 | 0.789 | 0.779 | 0.774 | 0.758 | 0.753 | 0.742 | 0.740 |
|  | crop | 0.873 | 0.871 | 0.864 | 0.865 | 0.852 | 0.844 | 0.822 | 0.810 | 0.804 | 0.783 |
| ID-LSTM | urban | 0.852 | 0.858 | 0.850 | 0.833 | 0.807 | 0.785 | 0.769 | 0.766 | 0.753 | 0.757 |
|  | crop | 0.912 | 0.906 | 0.902 | 0.891 | 0.872 | 0.865 | 0.848 | 0.819 | 0.819 | 0.805 |

Since the test data is skewed among land covers, we also measure the performance using F1-score on urban area and cropland. According to Table 5, ID-LSTM outperforms other methods in predicting both classes (~13% improvement over ANN). Moreover, we can notice that the performance on cropland is much better than that on urban area. As urban area does not appear in training set, the learned projection may not be accurate on urban area due to the projection shift. However, the results show that ilLSTM and ID-LSTM, by utilizing incremental update on model parameters and temporal features, lead to much better performance in predicting urban areas, especially at first several time steps.

4.4 Oil Palm Plantation Detection

We also validated the Dual-Memory LSTM embodiment in detecting oil palm plantations.

TABLE 6

The plantation detection performance of each method in 2009-2014, measured in F1-score

| Method | Set | 2009 | 2010 | 2011 | 2012 | 2013 | 2014 |
|---|---|---|---|---|---|---|---|
| ANN | train | 0.775 | 0.732 | 0.708 | 0.657 | 0.661 | 0.634 |
|  | test | 0.760 | 0.684 | 0.662 | 0.650 | 0.601 | 0.603 |
| RNN | train | 0.776 | 0.754 | 0.720 | 0.695 | 0.660 | 0.641 |
|  | test | 0.761 | 0.703 | 0.654 | 0.646 | 0.621 | 0.618 |
| LSTM | train | 0.794 | 0.779 | 0.748 | 0.736 | 0.685 | 0.653 |
|  | test | 0.768 | 0.712 | 0.680 | 0.653 | 0.640 | 0.624 |
| sLSTM | train | 0.841 | 0.808 | 0.786 | 0.736 | 0.709 | 0.704 |
|  | test | 0.828 | 0.746 | 0.744 | 0.740 | 0.700 | 0.664 |
| ilLSTM | train | 0.841 | 0.816 | 0.796 | 0.773 | 0.743 | 0.742 |
|  | test | 0.828 | 0.799 | 0.773 | 0.756 | 0.723 | 0.721 |
| ID-LSTM | train | 0.863 | 0.842 | 0.861 | 0.826 | 0.820 | 0.826 |
|  | test | 0.846 | 0.830 | 0.834 | 0.822 | 0.809 | 0.805 |

We utilize two latest manually created datasets—RSPO [P. Gunarso, M. E. Hartoyo, F. Agus, and others. 2013. RSPO, Kuala Lumpur, Malaysia. *Reports from the technical panels of the 2nd greenhouse gas working group of RSPO* (2013).] and Tree Plantation [RACHAEL Petersen, E D Goldman, N Harris, and others. 2016. Mapping tree plantations with multispectral imagery: preliminary results for seven tropical countries. WRI (2016).] to create ground-truth. RSPO is available on 2000, 2005, and 2009 while Tree Plantation is only available in 2014. We combine both datasets and utilize Enhanced Vegetation Index (EVI) time series from 2001 to 2014 and MODIS land cover product to create yearly ground-truth for 50,000 locations in Kalimantan, Indonesia through 2001-2014. Each location is labeled as one of the categories from {cropland, urban area, disturbed forest, undisturbed forest, mining, palm oil plantation, timber plantation, wasteland, water body} according to the land cover taxonomy in [P. Gunarso, M. E. Hartoyo, F. Agus, and others. 2013. RSPO, Kuala Lumpur, Malaysia. *Reports from the technical panels of the 2nd greenhouse gas working group of RSPO* (2013)].

We trained the Dual-memory LSTM and the baseline methods with the ground-truth on 25,000 randomly selected locations before 2008, and then tested on both training locations and the remaining 25,000 test locations for each year from 2009 to 2014. Since our created ground-truth is more accurate on plantations than other classes, we measured the performance using the F1-score on plantation class.

According to Table 6, ID-LSTM outperforms other methods in detecting plantations by a considerable margin. The prediction by ANN is unsatisfactory mainly due to its ignorance of spatio-temporal dependencies. Besides, the comparison between LSTM and sLSTM shows the effectiveness of including seasonal features and spatial context features in classification. The improvement from ilLSTM to ID-LSTM stems from the capacity of dual-memory structure in better modeling the locations that are impacted by short-term variation patterns. Finally, we conclude that the incremental update is critical for addressing temporal variation.

TABLE 7

The plantation prediction performance in 2009-2014, measured in F1-score. Each method is trained using the ground-truth during 2001-2005.

| Method  | 2009  | 2010  | 2011  | 2012  | 2013  | 2014  |
|---------|-------|-------|-------|-------|-------|-------|
| ANN     | 0.613 | 0.610 | 0.603 | 0.610 | 0.582 | 0.568 |
| RNN     | 0.650 | 0.641 | 0.628 | 0.623 | 0.611 | 0.602 |
| LSTM    | 0.695 | 0.685 | 0.673 | 0.674 | 0.645 | 0.613 |
| sLSTM   | 0.722 | 0.714 | 0.708 | 0.684 | 0.672 | 0.637 |
| ilLSTM  | 0.741 | 0.742 | 0.730 | 0.682 | 0.678 | 0.658 |
| ID-LSTM | 0.789 | 0.776 | 0.754 | 0.756 | 0.736 | 0.703 |

Although palm oil plantations expand very fast, there exist few plantations in our study region before 2005. We conducted another test using 30,000 selected locations, none of which are plantations before 2005. We trained each model using the ground-truth before 2005, and detected plantations after 2005. Due to the space limit, here we only show the performance after 2008 in Table 7. We observe that the performance greatly drops compared to the values in Table 6 due to the projection shift. However, we can still observe the superiority of ID-LSTM over other methods.

Figure 14:
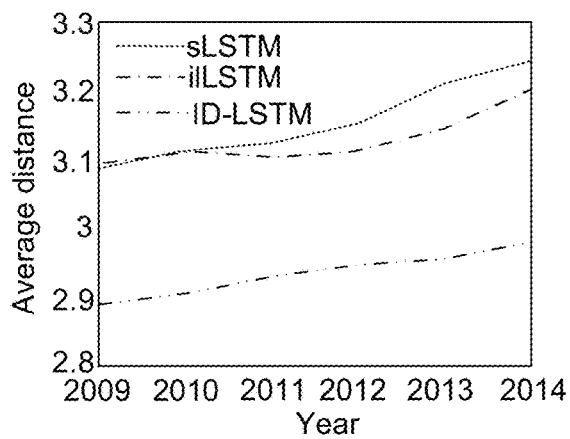
FIGS. 14(a) and 14(b) show graphs of the average distance from true classifications for locations and predicted classifications for locations in temporal feature space.
Figure 14:
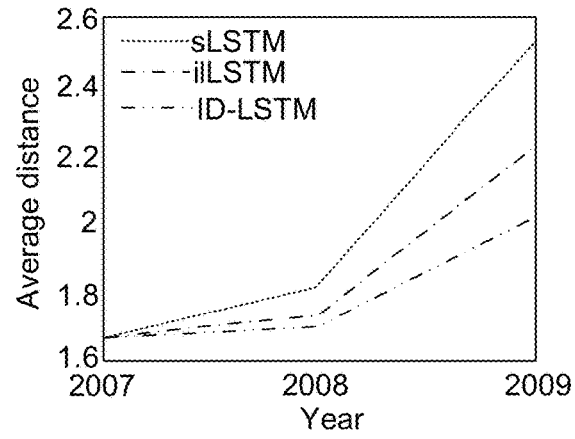

Given the previous results, we wished to better understand the impact of accumulated temporal variation over years. Compared with non-plantation locations, true plantation locations are found to be closer to plantation class in the temporal feature space. However, the distance gradually increases over years so they may be misclassified. In FIG. 14 we show the progression of average distance from true plantation locations to the temporal features of plantation class. Specifically, FIG. 14(a) shows the average distance from true plantation locations to "plantation" class in temporal feature space from 2009-2014 and FIG. 14(b) shows the average distance from burned locations to "burned area" class in temporal feature space from 2007-2009. We conclude that ID-LSTM is very effective in maintaining low distance values. The comparison between sLSTM and ilLSTM demonstrates the effectiveness of incremental updates.

Figure 15:
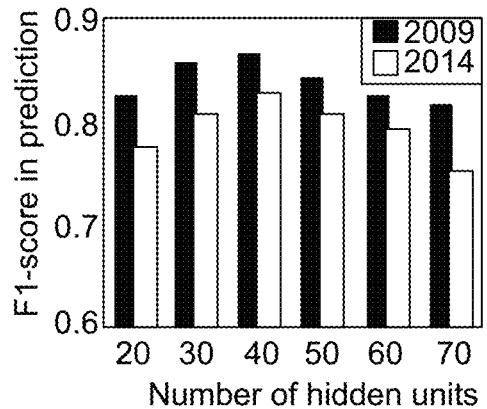
FIGS. 15(a)-15(d) show graphs of prediction performance with different dimensionality of hidden representation and temporal features for plantation and burned area predictions.
Figure 15:
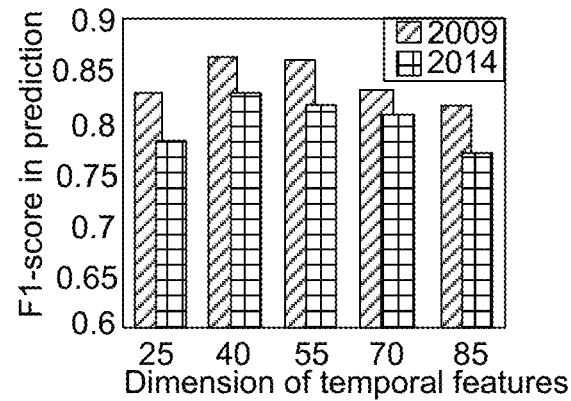
Figure 15:
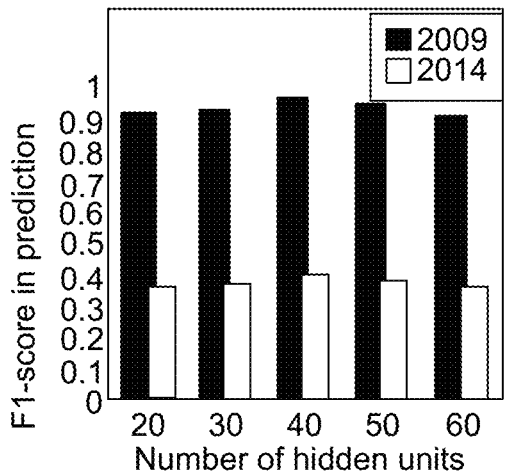
Figure 15:
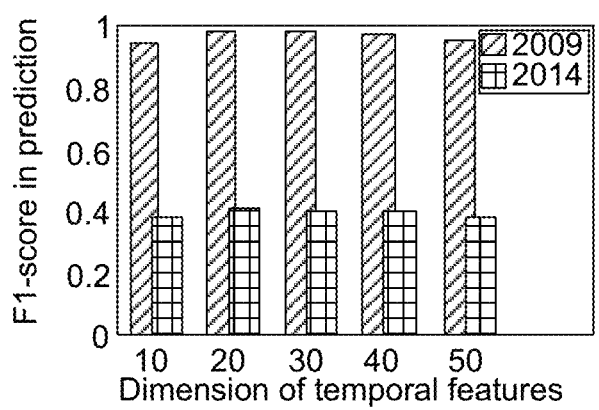

Furthermore, we conducted a parameter sensitivity test. In FIGS. 15(a) and 15(b), we measured the performance by changing the dimensionality of the hidden representation and the temporal features respectively in the plantation prediction and in FIGS. 15(c) and 15(d) we measured the performance (F1-score) on burned areas under different numbers of hidden variables and different numbers of dimensions of the temporal features, respectively. As observed, the dimensionality needs to be carefully chosen to reach the balance between bias and variance.

Figure 16:
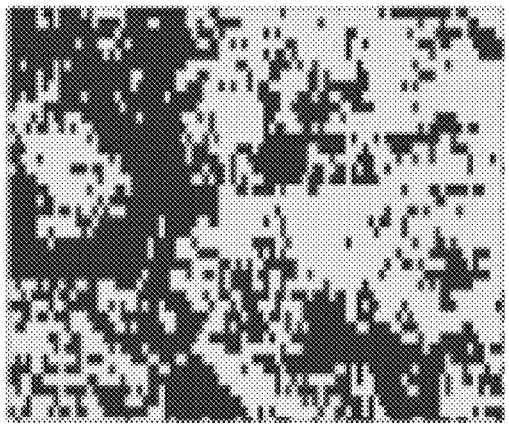
FIGS. 16(a) and 16(b) show predicted plantation locations using (a) ANN and (b) ID-LSTM.
Figure 16:
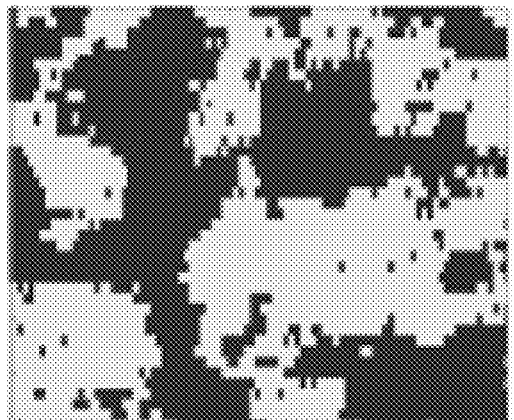
Figure 17:
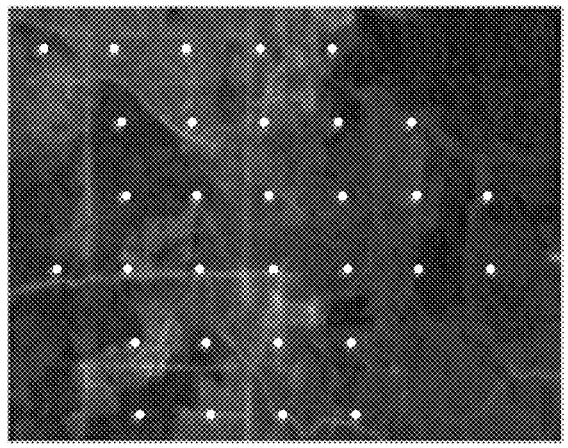
FIG. 17(a) shows an image with locations of incorrect ground truth for plantation identification.
FIG. 17(b) shows a high resolution image of the location shown in FIG. 17(a)
FIG. 17(c) shows an image with location of incorrect ground truth for forest identification.
FIG. 17(d) shows a high resolution image of the location shown in FIG. 17(c).
Figure 17:
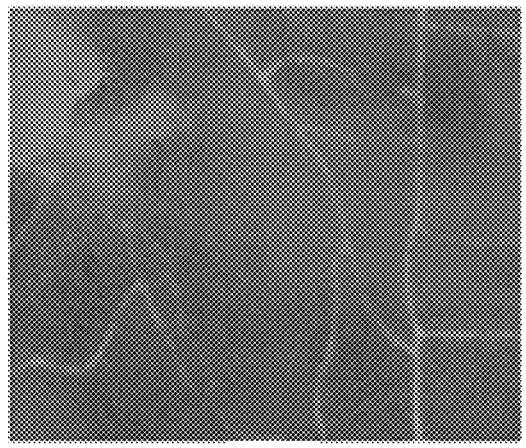
Figure 17:
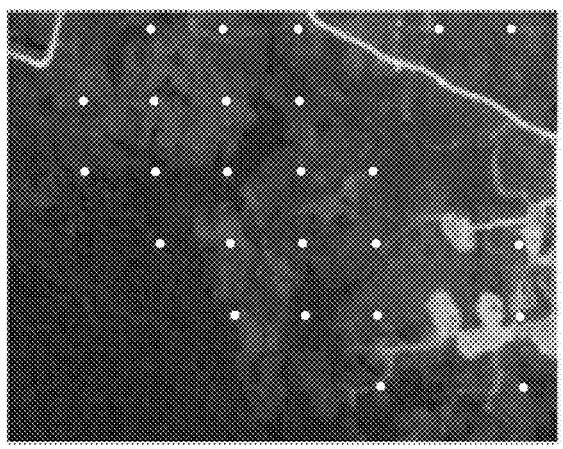
Figure 17:
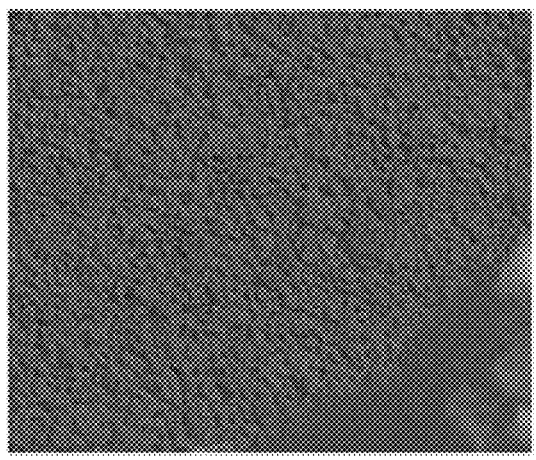

In FIGS. 16(a) and 16(b), we show detected plantations in light coloring in a specific 40×90 region using ANN and ID-LSTM, respectively. We can see that ID-LSTM can better delineate the plantation boundary and the detected plantations are contiguous over space while ANN results in both false positives and false negatives. We then compare the generated product by ID-LSTM to the manually created plantation ground-truth. In FIG. 17(a), we show a region with light dots showing pixels that were incorrectly set by hand as forest but were correctly detected by ID-LSTM as a plantation. In contrast, FIG. 17(c) shows a region with light dots showing pixels that were incorrectly set by hand as plantations but were correctly detected as forest by. The high-resolution images in FIGS. 17(b) and 17(d) confirm that ID-LSTM generates correct results in both cases. Therefore we conclude that our proposed framework can ensure the high quality of the generated land cover product.

4.3 Identifying Burned Area

Besides the planation detection, we also evaluated ID-LSTM on another application-identifying burned areas in Montana state, US. This task does not involve any novel/unseen classes, but is challenged by strong temporal variation and the seasonal patterns of forest fires. We obtained fire validation data until 2009 from government agencies responsible for monitoring and managing forests and wildfires. In total we select 15,107 MODIS locations and each location has a label from {burned area, forest, other} in every year from 2001 to 2009. In this application, the "other" class contains multiple types of land covers and these locations have different degrees of temporal variation.

We divide the data in the same proportion with our test in plantation application. Here we trained each method using the ground-truth until 2006 and predict on 2007-2009. From the results shown in Table 8, we can observe that our customized feature representation and the incremental update of dual-memory structure bring considerable improvement. On the other hand, we can find that all the methods have low F1-scores in 2009. Such result lies in that the burned locations in 2009 are very few, and both precision and recall will be severely disturbed by any classification errors.

TABLE 8

The prediction of burned area in 2007-2009 measured in F1-score.

| Method  | Set   | 2007  | 2008  | 2009  |
|---------|-------|-------|-------|-------|
| ANN     | train | 0.840 | 0.554 | 0.116 |
|         | test  | 0.774 | 0.482 | 0.073 |
| RNN     | train | 0.895 | 0.618 | 0.124 |
|         | test  | 0.868 | 0.582 | 0.079 |
| LSTM    | train | 0.905 | 0.643 | 0.163 |
|         | test  | 0.902 | 0.619 | 0.150 |
| sLSTM   | train | 0.981 | 0.834 | 0.258 |
|         | test  | 0.976 | 0.806 | 0.244 |
| liLSTM  | train | 0.981 | 0.907 | 0.363 |
|         | test  | 0.976 | 0.894 | 0.346 |
| ID-LSTM | train | 0.984 | 0.943 | 0.407 |
|         | test  | 0.978 | 0.939 | 0.368 |

We then conduct sensitivity test and obtain similar results, as depicted in FIGS. 15(c) and 15(d). We also track the average distance of all the burned locations to the "burned area" class in the temporal feature space. According to FIG. 14(b), the average distance by ID-LSTM increases much slower than the other methods.

5 Conclusion

In accordance with a first embodiment, a spatio-temporal framework is provided for land cover prediction. We first combine the spatial context features and temporal relationship to discover the land cover transitions. Then we utilize the incremental learning to incorporate knowledge from more recent years, and adapt the learned model to the varying spectral features. The experimental results on plantation and burned area detection demonstrate the effectiveness of both the transition modeling and the incremental learning strategy. Besides, the proposed method has potential to contribute to a much larger community of land cover discovery problems and to assist in understanding global environment and climate change.

In a second embodiment, ID-LSTM is provided for land cover prediction. Compared with traditional classification methods, ID-LSTM contains two memories that can capture both long-term and short-term variation patterns. The dual-memory structure is incrementally updated to include the latest information about the ever-changing environment. Experiments on both synthetic real-world datasets demonstrate that ID-LSTM can successfully detect both existing and unseen classes. Also, it is observed that the incremental update of dual-memory structure can effectively address the temporal variation. In addition, our comparison with state-of-the-art plantation ground-truth data shows that ID-LSTM can generate a high-quality product, and thus has a potential to contribute to a larger community of land cover problems and to assist in understanding global environmental change.

Figure 18:
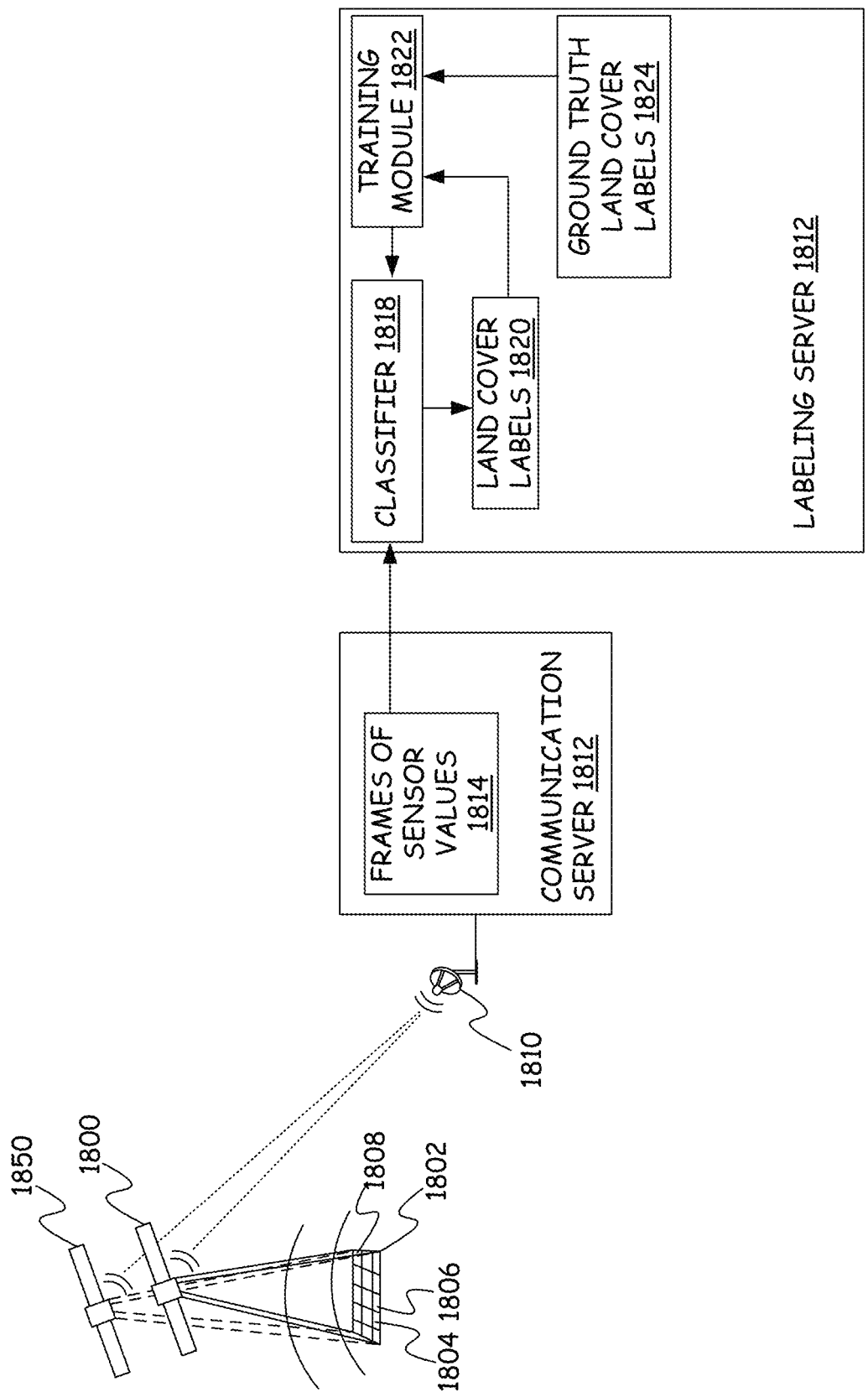
FIG. 18 is a block diagram of a system in accordance with one embodiment.

FIG. 18 provides a system diagram of a system used to improve the efficiency and accuracy of computer-based labeling technology that automatically labels satellite data to determine land covers. In FIG. 18, a satellite 1800, positioned in orbit above the earth and having one or more sensors, senses values for a geographic location 1802 that is comprised of a plurality of geographic areas/smaller geographic locations 1804, 1806 and 1808. Multiple sensors may be present in satellite 1800 such that multiple sensor values are generated for each geographic area of geographic location 1802. In addition, satellite 1800 collects frames of sensor values for geographic location 1802 with each frame being associated with a different point in time. Thus, at each point in time, one or more sensor values are determined for each geographic area/smaller geographic location in geographic location 1802 creating a time series of sensor values for each geographic area/smaller geographic location. Satellite 1800 transmits the sensor values to a receiving dish 1810, which provides the sensor values to a communication server 1812. Communication server 1812 stores the sensor values as frames of sensor values 1814 in a memory in communication server 1812. A labeling server 1816 receives frames of sensor values 1814 and provides the received frames of sensor values to a classifier 1818 of one of the present embodiments, which classifies each geographic area/smaller geographic location in each frame into one of a set of land cover classes such as Forest, Urban, Burned, Plantation, Unburned, and Water, for example, to produce land cover labels 1820. Classifier 1818 is initially trained by a training module 1822 using ground truth land cover labels 1824 for some of the geographic areas/smaller geographic locations at certain time points. Classifier 1818 is incrementally trained by training module 1822 as discussed above using some of ground truth land cover labels 1824 and some of land cover labels 1820.

Figure 19:
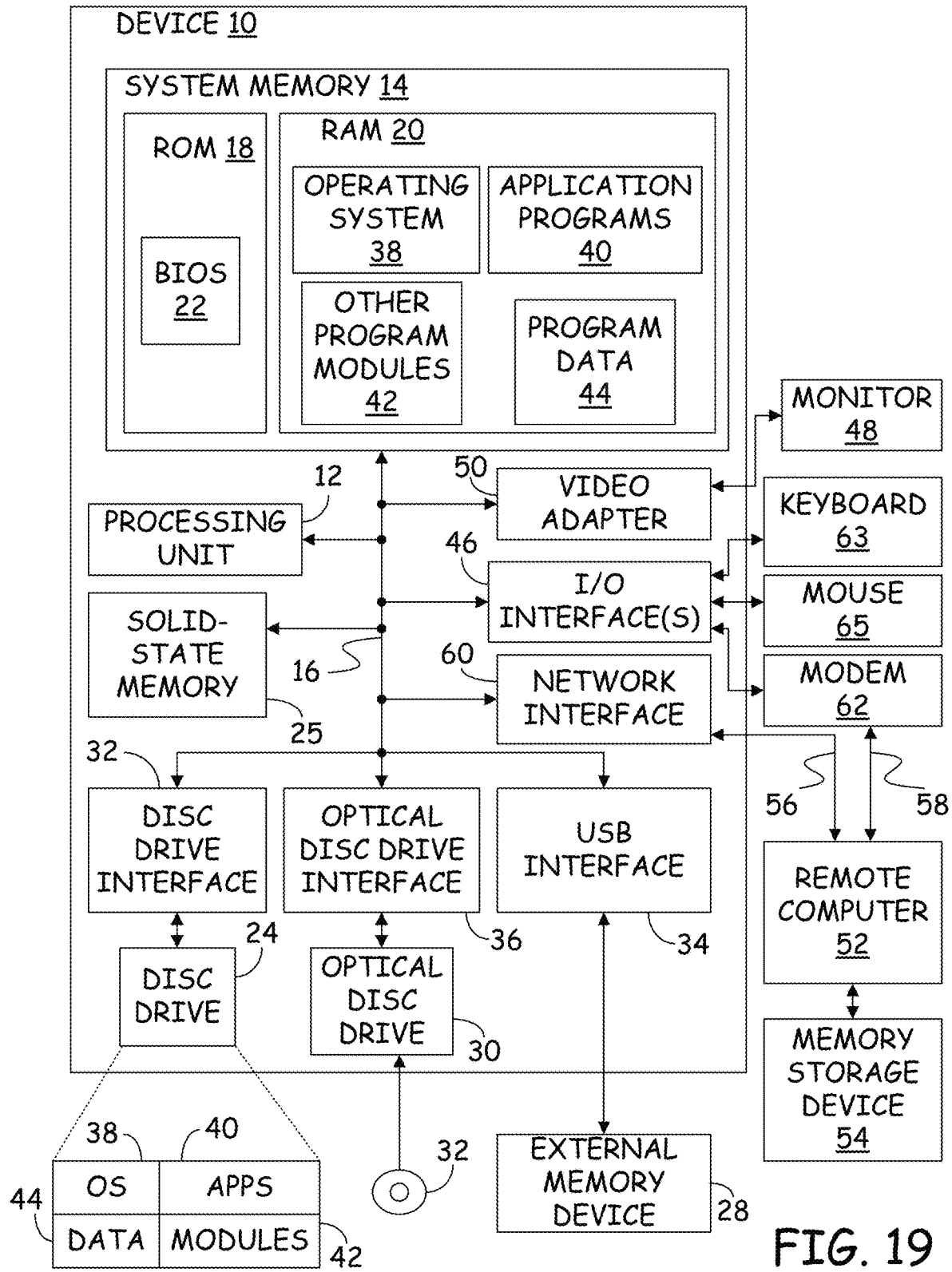
FIG. 19 is a block diagram of a computing device used in the various embodiments.

An example of a computing device 10 that can be used as a server and/or client device in the various embodiments is shown in the block diagram of FIG. 19. For example, computing device 10 may be used to perform any of the steps described above. Computing device 10 of FIG. 19 includes a processing unit (processor) 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes a hard disc drive 24, a solid state memory 25, an external memory device 28, and an optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives, solid state memory and external memory devices and their associated computer-readable media provide nonvolatile storage media for computing device 10 on which computer-executable instructions and computer-readable data structures may be stored. Other types of media that are readable by a computer may also be used in the exemplary operation environment.

A number of program modules may be stored in the drives, solid state memory 25 and RAM 20, including an operating system 38, one or more application programs 40, other program modules 42 and program data 44. For example, application programs 40 can include instructions for performing any of the steps described above. Program data can include any data used in the steps described above.

Input devices including a keyboard 63 and a mouse 65 are connected to system bus 16 through an Input/Output interface 46 that is coupled to system bus 16. Monitor 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

Computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 19. The network connections depicted in FIG. 19 include a local area network (LAN) 56 and a wide area network (WAN) 58. Such network environments are commonplace in the art.

Computing device 10 is connected to the LAN 56 through a network interface 60. Computing device 10 is also connected to WAN 58 and includes a modem 62 for establishing communications over the WAN 58. The modem 62, which may be internal or external, is connected to the system bus 16 via the I/O interface 46.

In a networked environment, program modules depicted relative to computing device 10, or portions thereof, may be stored in the remote memory storage device 54. For example, application programs may be stored utilizing memory storage device 54. In addition, data associated with an application program may illustratively be stored within memory storage device 54. It will be appreciated that the network connections shown in FIG. 19 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A method comprising:
    receiving features for a plurality of locations for a plurality of times;
    selecting a location and for the selected location performing steps comprising:
        for each time in the plurality of times:
            determining a long-term memory latent representation of the received features based on long-term memory parameters trained using features from a first number of previous time points;
            determining a short-term memory latent representation of the received features based on short-term memory parameters trained using features from a second number of previous time points, wherein the second number is smaller than the first number;
            selecting an output latent representation from between the long-term memory latent representation and the short-term memory latent representation; and
            using the output latent representation to predict a land cover for the selected location at the time in the plurality of times.

2. The method of claim 1 wherein selecting the output latent representation comprises using the features of the selected location for the time and spatial context features generated from multi-spectral values of neighboring locations at a previous time.

3. The method of claim 2 wherein the spatial context features are generated from the multi-spectral values of neighboring locations using a non-linear mapping parameter trained on land cover transitions of locations relative to land cover transitions of neighboring locations.

4. The method of claim 1 wherein using the output latent representation to predict a land cover for the selected location comprises applying weight parameters to the output latent representation to form a temporal feature vector and selecting a land cover class having a centroid temporal feature vector that is closest to the formed temporal feature vector.

5. The method of claim 4 wherein the predicted land cover does not have to appear at the location at previous time points in order to be predicted for the time.

6. The method of claim 5 wherein the centroid temporal feature vector is extracted from observed sequences of land cover classes across a plurality of locations.

7. The method of claim 1 wherein the received features comprise seasonal features formed from multi-spectral features.

* * * * *